United States Patent
Lee et al.

(10) Patent No.: US 10,383,005 B2
(45) Date of Patent: Aug. 13, 2019

(54) PEER TO PEER VEHICLE AD HOC NETWORK WITH BANDWIDTH BONDING, SEAMLESS MOBILITY AND FLOW-BASED ROUTING

(71) Applicant: IST International, Inc., Aliso Viejo, CA (US)

(72) Inventors: Albert Lee, Aliso Viejo, CA (US); Wei K Tsai, Irvine, CA (US)

(73) Assignee: ANTEL INC., Irvine, CA (US)

( * ) Notice: Subject to any disclaimer, the term of this patent is extended or adjusted under 35 U.S.C. 154(b) by 652 days.

(21) Appl. No.: 14/907,567

(22) PCT Filed: Jul. 30, 2014

(86) PCT No.: PCT/US2014/048758
§ 371 (c)(1),
(2) Date: Jan. 26, 2016

(87) PCT Pub. No.: WO2015/017483
PCT Pub. Date: Feb. 5, 2015

(65) Prior Publication Data
US 2016/0174106 A1    Jun. 16, 2016

Related U.S. Application Data

(60) Provisional application No. 61/860,246, filed on Jul. 30, 2013.

(51) Int. Cl.
*H04W 28/10* (2009.01)
*H04W 40/20* (2009.01)
(Continued)

(52) U.S. Cl.
CPC .............. *H04W 28/10* (2013.01); *H04B 7/14* (2013.01); *H04L 45/122* (2013.01);
(Continued)

(58) Field of Classification Search
CPC ..... H04W 28/10; H04W 72/04; H04W 40/18; H04W 40/20; H04W 84/18; H04L 45/122
See application file for complete search history.

(56) References Cited

U.S. PATENT DOCUMENTS

2008/0240026 A1* 10/2008 Shih ...................... H04W 40/16
370/329
2010/0085948 A1* 4/2010 Yu ........................... H04L 12/66
370/338

(Continued)

FOREIGN PATENT DOCUMENTS

| CN | 102256333 A | 11/2011 |
|---|---|---|
| CN | 102413536 A | 4/2012 |

(Continued)

*Primary Examiner* — Chi Ho A Lee
*Assistant Examiner* — Andrew Lee
(74) *Attorney, Agent, or Firm* — Chanmin Park

(57) ABSTRACT

Peer to Peer Vehicle Ad Hoc Network is implemented with a distributed P2P model for means of a decentralized model to house data/applications and bonding technologies to reduce collisions, which is extremely high for the accepted VANET standard of 802.11p. The inventive technology provides virtualization of various heterogeneous networks into a single abstract layer of data network, fast soft and hard handoff among various data networks with different link layer characteristics within half RTT plus hardware switching time, a complete load balance of data traffics within and among data networks, optimization of data network resource such as available bandwidths (optimal distributions available resources among the users of networks) with the ability of multi-path unicast for each Internet session, utilization of shortest path algorithm for the adhoc access network routing.

15 Claims, 16 Drawing Sheets

(51) Int. Cl.
*H04B 7/14* (2006.01)
*H04L 12/733* (2013.01)
*H04W 40/18* (2009.01)
*H04W 40/36* (2009.01)
*H04W 72/04* (2009.01)
*H04W 40/24* (2009.01)
*H04W 84/22* (2009.01)
*H04W 84/00* (2009.01)
*H04W 84/18* (2009.01)

(52) U.S. Cl.
CPC ........... *H04W 40/18* (2013.01); *H04W 40/20* (2013.01); *H04W 40/36* (2013.01); *H04W 72/04* (2013.01); *H04W 40/24* (2013.01); *H04W 84/005* (2013.01); *H04W 84/18* (2013.01); *H04W 84/22* (2013.01)

(56) References Cited

U.S. PATENT DOCUMENTS

| | | | | |
|---|---|---|---|---|
| 2011/0228742 A1* | 9/2011 | Honkasalo | ............ | H04L 5/0007 370/330 |
| 2012/0120883 A1* | 5/2012 | Chen | .................... | H04W 74/08 370/329 |
| 2012/0155557 A1* | 6/2012 | Bush | ..................... | H04L 45/124 375/257 |
| 2013/0010774 A1 | 1/2013 | Subramanian et al. | | |
| 2013/0097246 A1* | 4/2013 | Zifroni | ................... | G06Q 50/01 709/204 |
| 2013/0099941 A1 | 4/2013 | Jana et al. | | |
| 2013/0114546 A1* | 5/2013 | Stanwood | ............ | H04L 5/0007 370/329 |
| 2013/0215942 A1* | 8/2013 | Addepalli | ............ | H04L 27/345 375/224 |
| 2014/0269482 A1* | 9/2014 | Pandey | ................... | H04W 4/06 370/312 |
| 2015/0023668 A1* | 1/2015 | Spaulding | .......... | H04B 10/1129 398/106 |
| 2016/0112305 A1* | 4/2016 | Djekic | .................... | H04L 12/54 370/235 |

FOREIGN PATENT DOCUMENTS

| | | |
|---|---|---|
| CN | 102695287 A | 9/2012 |
| CN | 103002017 A | 3/2013 |
| KR | 1020090054163 A | 5/2009 |
| WO | WO2008051264 A1 | 5/2008 |

\* cited by examiner

PEER TO PEER VEHICLE AD HOC NETWORK WITH BANDWIDTH BONDING, SEAMLESS MOBILITY AND FLOW-BASED ROUTING

RELATED APPLICATIONS

This application claims priority on U.S. Provisional Application No. 61/860,246 filed on Jul. 30, 2013, the disclosure of which is incorporated by reference to this application.

FIELD OF THE INVENTION

The present invention relates in general, to vehicle ad hoc networks (VANETs), mesh Wi-Fi networks, and networks formed by customer premise equipment (CPE) as an access network, and in particular, to channel assignment, routing, flow control, methods for promoting bandwidth sharing in VANET, and business model for offering wireless data bandwidth, with 3rd party vendor providing all kinds of electronic services through handsets.

BACKGROUND OF THE INVENTION

Explanation of background of the present invention starts with a VANET without roadside units. As roadside units mostly serve as gateways to the Internet, such a VANET becomes a huge intranet, which is an isolated IP (Internet Protocol) network. Such kind of VANETs will be referred to as pure VANETs in this application.

The main issue of a pure VANET is its performance. First, the number of hops needed between two communicating end points can become excessively large. Second, a pure VANET can be disconnected if there are insufficient VANET vehicles on the street.

To understand this problem, consider the case wherein two VANET vehicles communicate with one another, with a highways distance of 300 km separating between them. Using directional antennas, distance between transmitting and receiving vehicles over a single hop can be as high as 2-6 km. Thus, the number of hops in the round trip between these two vehicles is between 100 and 300. If per hop delay is 5 msecs, the total round trip time between the two vehicles could be as high as 1500 msecs, which is unacceptable. Therefore, for a pure VANET to be practical, it is necessary to minimize per hop delay. Further, another way to tackle the latency problem is to minimize the number of hops between two communications end points.

Yet another major technical problem with a pure VANET is lack of centralized infrastructure. In a pure VANET, the entire network is comprised of VANET devices installed in VANET vehicles. Typically a VANET device is a telematics box with limited computing and communications capacity. There are no centralized servers, switches, routers, or other heavy-duty telecommunications gears, which are often deployed by carriers. The challenge is to enable network control and management functions such as routing, connection setup/tear-down, without these gears organized in a centralized infrastructure.

Therefore, a pure VANET is highly inadequate to provide telecommunication services such as mobile voice, mobile Internet, etc., which are routinely provided by carriers.

Second, the background of the present invention is explained with regard to optimal routing and incentives in VANET.

The wireless technology has now reached its theoretical limits (constrained by physics) that are impossible to surpass. The only way to further increase data speed is to shorten the transmission range and use smaller cells. Since the introduction of iPhones, the smartphone demand has skyrocketed. Thus, the demand for wireless mobile data bandwidth is ramping up at the time when the supply of bandwidth is hitting the ultimate bottleneck.

This problem is particularly acute for vehicle mobile Internet (VMI) services. All major automakers of the world have spent a large sum of money to develop telematics services in the past decade. With the increasing popularity of wireless data services, demand for in-vehicle data services is also rising. One major issue facing VMI services is the need for high data rates.

VMI services are different from data services for small handheld devices. For smartphones, the display size is usually small (3"-4" display). However, for in-vehicle Internet services, the actual device could be multiple laptops (10"-20" display), multiple smartphones, or in-vehicle Internet devices of all kinds. Thus, the data rate required for VMI is a lot more than the data rate required for a smartphone.

The data rate is especially large if multimedia and streaming applications are used in a car. For medium-quality video streaming, a minimum of 800 Kbps to 1.15 Mbps is needed. For live stream HDTV, the data rate requirement jumps to 8-10 Mbps. Thus, when there are multiple laptops streaming high-quality videos in the same vehicle, the bandwidth requirement can jump to 10-20 Mbps, which is not sustainable in today's 3G or 4G networks.

The 326 Mbps peak download speed from the LTE technology is misleading. This speed is only achievable near the cell center. If a terminal is at mid-range or a far distance from the cell center, the drop in peak data rate is large—the drop in data rate is exponential in distance. Further, as more bits are stuffed in each symbol, the rate is highly susceptible to interference from obstructing objects (glass buildings and elevators especially). Therefore, the traditional macro-cell architecture is no longer feasible if HDTV streaming is required in a car.

Therefore, the VANET architecture is almost assuredly needed even as carriers are touting 4G (LTE, WiMAX, HSPA+) technologies. No matter what will happen, due to the fundamental limits imposed by physics, the only way to provide HDTV and other high-bandwidth services in a vehicle is via a small-cell short-range transmission infrastructure. Since vehicles are mobile, the infrastructure has to be ad hoc—this means the VANET architecture.

The most common VANET architecture is based on the Wi-Fi technology. Currently, IEEE is in the process of standardizing the 802.11p (WAVE) technology based on this architecture.

In a VANET, there are two kinds of communication: vehicle-to-vehicle (V2V) and vehicle-to-roadside (V2R). The two major technical issues for VANET are: (a) high MAC (media access control) layer overheads in the ad hoc communication, and (2) inefficient routing.

In the current VANET technology, vehicles communicate with one another by tuning to the same channel. Since Wi-Fi is based on CSMA C/A (carrier sense multiple access collision avoidance) control scheme, a transmitter is allowed to send if it senses that the channel is unused. This can result in packet collisions. Such issues are called the hidden node problem, which includes two sub-problems: the hidden terminal problem and the hidden transmitter problem. There are two approaches to this problem: (1) explicit reservation, (2) and implicit reservation.

In the explicit reservation approach, a common method is to use RTS (request-to-send) and CTS (clear-to-send) signaling to reserve a packet/frame slot. Such a scheme may incur too much delay and is not suitable for real-time applications. Other explicit reservation schemes use a TDMA (time division multiplexing) method. One example is called STDMA (self-organizing TDMA) which is used in a commercial system called AIS (automatic identification system) for communications between ships.

In the implicit reservation approach, priority queuing is used. This is the approach adopted by IEEE 802.11p. The problem with such a scheme is that delay is unbounded.

No matter which scheme is used, excessive amount of time is wasted in control signaling. For most data applications, any RTT (round trip time) greater than 300 ms (milliseconds) is barely tolerable. For real-time applications such as voice conversations, RTT greater than 250 ms is impossible. Now, MAC layer control can add as much as 20-30 ms per hop in a VANET. If the a packet has to traverse 10 hops in a VANET, the delay incurred in the VANET is already 200-300 ms, making the VANET unsuitable as a high-quality internet medium.

To minimize the number of hops inside a VANET, it is necessary to allow more transmitters to send to the same receiver. This may cause packet collisions at the receiver if no reservation is made. Two issues arise from this approach. How to choose a proper receiver from a group of VANET nodes, and how to minimize packet collisions?

Another major technical issue for a VANET is that routing is inefficient and unreliable. The conventional shortest path routing does a poor job in an ad hoc network where the network topology can change rapidly. Often the computation to find the best path takes too much time, and the paths found remain problematic (having a long latency, for example). In addition, a single or multiple faults can disconnect a node easily.

A major business issue in VANET deployment is getting a critical mass of roadside access points. The present invention will also provide a method for incentivizing roadside merchants and residents to share their broadband bandwidth via access points.

For the easy reference, a VANET that is constructed in accordance with the present invention will be referred to as VINET (vehicle inter-network).

Third, the background of the invention is explained with regard to P2P mobile virtual network operator model and routing. In a VANET, free Wi-Fi bandwidths are available to for both V2V (vehicle to vehicle) and V2R (vehicle to roadside) data communications. A major application of VANET is VMI (vehicle mobile Internet), in which a user in the car connect to the Internet through a gateway which serves as the backhaul access point to the Internet. The VANET operator pays for the backhaul bandwidth, and the VANET vehicle owners pay for the Wi-Fi bandwidth within the VANET. In this case, the vehicle owners share the V2V bandwidth, and the vehicle owners and the VANET operator share the V2R bandwidth. The carriers have on contribution to the bandwidth in this setup However, when the number of VANET vehicles on the street is too low, for example, at night or during the holidays, a VANET operator will enable a VANET vehicle to connect directly to a cellular carrier. At the writing of the present invention, no commercial VANET is operational, and often a carrier will offer VMI service to vehicle owners.

Fourth, the background of the invention is explained with respect to business scheme that can be realized with the present invention. Free-Air business model has numerous ways of monetizing the free services, among them, the primary and native is LBMA.

LBMA has been touted as the Holy Grail of advertising because of geo-targeting. These ads are given at a time when a consumer actually needs merchants' information or at a location where he welcomes the convenience of piggybacking on his intended trip.

The CTR (click through rate) for LBMA is about 10 times better than non-targeted ads. In a recent month-long trial by Chili's using Navteq's LocationPoint platform, the advertisers posted a click-through rate high of 2.49 percent—more than 13 times the 0.19 average of online banner ads, according to Forrester Research.

The Navteq trial found that of those consumers who clicked on location intelligent ads, 39 percent clicked through for additional details, including turn-by-turn or step-by-step directions to the advertised merchant's retail location. In Europe similar trials show 7 percent CTR and a 39 percent conversion to "click to map."

Navteq adds: "The power of location-based advertising is creating a virtual storefront." LBMA actually extends retailers' storefront a couple-mile radius around the location, essentially inviting the ad receiver to come in and transact.

SUMMARY OF THE INVENTION

It is an object of the present invention to provide a virtual circuit routing technology that minimizes per-hop delay in a pure VANET.

It is another object of the present invention to utilize a DHT (distributed hash table) based distributed algorithm in assigning IP addresses in a pure VANET.

It is yet another object of the present invention to utilize a DHT-based distributed algorithm for storing and retrieving IP addresses for nodes in a pure VANET.

It is yet another object of the present invention to provide a distributed algorithm to modify routing tables in a pure VANET, wherein the routing tables enable virtual circuit routing of IP packets.

It is yet another object of the present invention to enable data frame transmissions from a secondary relay node if a primary relay node fails to forward a block of data frames within a set time limit.

It is yet another object of the present invention to provide a channel assignment algorithm that will minimize the number of hops a packet has to traverse in a VINET.

It is yet another object of the present invention to use a TDMA (time division multiple access) scheme as an option for packet reservations so as to minimize packet collisions in a VINET.

It is yet another object of the present invention to provide a scheme to select relay nodes from a group of potential VINET nodes.

It is yet another object of the present invention to provide a routing algorithm which is based on the principle of paralleling packet flows with traffic flows.

It is yet another object of the present invention to provide incentives for roadside merchants and residents to share their broadband bandwidths in a VINET social network.

It is yet another object of the present invention to provide a framework to unlock the economic value of the Wi-Fi bandwidths of a home owner who pays for the broadband Internet connection through a P2P MVNO business model.

It is yet another object of the present invention to provide a framework to unlock the economic value of V2V and V2R Wi-Fi bandwidths of a VANET operator and the individual vehicle owners who participate in the VANET through a P2P MVNO business model.

It is yet another object of the present invention to provide a general framework to unlock the economic value individual owner of a piece of customer premise equipment (CPE), such as a smartphone, a laptop, a tablet PC, a MID (mobile Internet device), a PDA, or any handheld device that is connectable to the Internet through a wireless interface through a P2P MVNO business model.

It is yet another object of the present invention to assign orthogonal radio channels for all simultaneous V2V and V2R transmissions that arrive at the same location.

It is yet another object of the present invention to set up virtual circuits in a VANET in accordance with location coordinates.

It is yet another object of the present invention to enable multipath packet from a single source to single destination, wherein part of the paths reside within a VANET or a composite Wi-Fi mesh network.

In order to achieve the objects, the present invention provides an electronic data communication network comprising a plurality of moving nodes and a plurality of stationary nodes. The moving node comprises a vehicle communication device installed in a human-controlled vehicle. The human-controlled vehicle moves along predetermined paths. The moving node comprises a starting node that sends the data, a relay node that relays the data, and an ending node that receives data. A virtual circuit is formed along a path comprising the relay nodes for data communication. The virtual circuit is identified by the path; wherein routing of data from the starting node to the ending node is performed with P2P routing algorithm. The stationary node comprises a fixed communication device installed in a fixed communication structure. The stationary node is connected to the Internet.

The predetermined paths comprise a plurality of roads for vehicles and the stationary nodes comprise a plurality of road side units installed along the roads. The stationary node further comprises a plurality of commercial units. Merchant of the commercial unit is notified with information for moving nodes approaching to the commercial unit. The merchant provides time and location dependent advertisements to users of the moving nodes. The advertisements are filtered by the users of the moving nodes. The positions of moving nodes relative to the stationary nodes form a map for the moving nodes. The merchants are provided user's preference together with the position of the user within the map.

The road comprises a plurality of zones. The virtual circuit is tied to the zones. The virtual circuit operates at layer 2 as a service to layer 3. Data frame is identified a virtual circuit ID at layer 2. The node looks up the virtual circuit ID, retrieves the identifier of the next channel to transmit the frame from a virtual circuit routing table using the virtual circuit ID, whereby the processing delay is comprised of the virtual circuit ID lookup time and the time to retrieve the next channel identifier.

The relay node is chosen utilizing broadcast so that the distance between a transmitting node and a receiving node is increased up to a threshold value that provides minimum effective bandwidth, whereby the number of hops between two end points is minimized.

A routing table comprises records. The record comprises VCID, node_status field, and next_channel ID. The node keeps track of the location by the subzone ID and the number of virtual circuits for which the node carries traffic.

The P2P routing algorithm performs updating the current subzone position for each node, detection of a node in a virtual circuit has left the network, selection of a new node in the virtual circuit that has change in its nodes, determination of the channel number for each node in each virtual circuit, updating the routing table according to the changes in the nodes, and setting up and tearing down virtual circuit, whereby moving of the vehicles relative to the roads is reflected.

The GPS coordinate of a subzone is mapped to the IP address of a node in the subzone, whereby the IP address of the node approximately reflects the GPS coordinates of the node. Each node maintains a table of active IP addresses in the subzone in which it is located. The table is updated using a distributed hash table algorithm, whereby IP address conflicts are avoided.

The predetermined path for the vehicles comprise a relative topology in which all moving nodes moving on the same road have zero relative velocity. The subset of all moving nodes on the same road form a relative topology that does not change in time. Packets from and to the nodes inside a subset of the relative topology are restricted to restricted to be routed through the nodes in the subset of moving nodes and bordering nodes, whereby the routing in the network is decomposed into routings associated with individual relative topologies.

Routing is performed so that the packet flows from the Internet to moving nodes are in the anti-parallel direction of the traffic flow, and the packet flows from the moving nodes to the Internet are in the parallel direction of the traffic flow, whereby need for forced handovers is reduced.

All moving nodes on the same road are organized into disjoint subsets. Each disjoint subset is assigned a discrete color. Packets are forwarded from one colored subset to the next colored subset.

Data frames are reserved in blocks. Each block is assigned a block ID. A number of relay moving nodes are specified as backup relay node. If timeout occurs, then backup relay node making the detection retransmits the block. The block ID is unique in all the transmissions from a source moving node to a destination stationary node.

A control plane maintains topology tables and IP address tables to enable moving nodes and stationary nodes to find each other in terms of IP addresses; assigns channels; and calculates potential trajectory of each moving node to start an anticipative handover.

Packets are transmitted within the same TCP connection using multiple bandwidths whereby bandwidth bonding increases throughput.

The user of the vehicle communication device is provided with a stationary communication device that is adapted to be used at a fixed location, is included as part of the network, and is authenticated for the same user.

In accordance with one aspect of the present invention, the P2P MVNO offer free in-network services as incentives to get new subscribers (also called members or peers) to join the MVNO. Free in-network services may include free VoIP, video conferencing, and location-based services.

In accordance with one aspect of the present invention, taxies on the streets are targeted as the initial customers in the P2P MVNO, wherein each participating taxi will get services from the P2P MVNO such as call-center service, mVoIP (mobile voice over IP), VMI service, and LBSs (location-based services).

In accordance with another aspect of the present invention, a composite Wi-Fi mesh network on the street is formed by connecting CPE devices on the street, roadside APs (access points), femtocells APs, and picocells APs, using both the ad hoc mode and the infrastructure mode.

In accordance with another aspect of the present invention, bandwidth bonding, vertical handover, and multi-path packet delivery mechanisms are employed to increase the total bandwidths and reliability of the composite Wi-Fi mesh network.

In accordance with one aspect of the present invention, a distributed algorithm is used to store the IP addresses of the nodes in the composite Wi-Fi mesh network in a distributed database. This algorithm is based on DHTs (distributed hash tables).

In accordance with another aspect of the present invention, the composite Wi-Fi mesh network perform self-scaling, self-healing, and self-organization, based on a distributed algorithm using DHTs.

Free-Air is a virtual infrastructure (VI) service in that it organizes vast amounts of free resources around the globe into a useful distributed facility to provide three free services: (a) free Wi-Fi access to the Internet on the street/commercial areas, (b) mobility support for data, and (c) mobility support for streaming applications such as voice over IP (VoIP).

The free resources are mobile terminals (smartphones, laptops, tablets, and mobile Internet devices), Wi-Fi access points (APs), and desktop PCs and servers owned by individuals or merchants. These resources are willingly shared by the owners because of strong incentives provided by the Free-Air business model.

Owners of mobile terminals are strongly motivated to get free Wi-Fi bandwidths in public areas (streets, plazas, hallways in shopping malls) and on the commercial premises (shops). Today, many will simply go to Starbucks or any stores that provide free Wi-Fi just to get connected.

Merchants are often happy to provide free Wi-Fi bandwidths as they tend to increase sales. In the Free-Air model, the primary monetization is called Ad-Flow. This is a location-based mobile advertising (LBMA) scheme. Merchants will be able to offer e-coupons and special deals through mobile ads using a Free-Air application running on Free-Air enabled mobile terminals. The Free-Air virtual infrastructure will match handsets with merchants according to a prescribed set of conditions.

Mobility support is an important enhancement for Wi-Fi users. On busy streets or shopping plazas, there will be many free Wi-Fi APs. It will be a nuisance to experience stop-n-reconnect Web access. With seamless mobility between Wi-Fi cells, users will not sense a handover has occurred. Commercial-grade VoIP services like Skype will enjoy seamless handover between two Wi-Fi cells. As these VoIP services are either free or extremely low priced, incentives for handset owners to go to a Free-Air Wi-Fi zone is very strong.

In order to get full benefits, both individuals and merchants have to become a member of the Free-Air community. Membership will be provided for free. In exchange for the benefits, a handset owner must consent to run a Free-Air application on their terminals once they are within a Free-Air zone. Similarly, merchants must run a Free-Air application that allows them to send mobile ads to the matched handsets. All equipment of the members (handsets, APs, and PCs) must allow insertion of lightweight Free-Air software that enables the functionalities of the Free-Air services.

As all parties (individuals and merchants) will only benefit tremendously by joining the Free-Air membership, a large customer base will be acquired within a short period of time.

In the second phase of the Free-Air business model, a commercial VANET (vehicle ad hoc network) will be constructed. In this VANET, a telematics box with multiple antennas will be installed on VANET vehicles. In addition, multiple-antenna Wi-Fi APs using 802.11a channels on the roadside will also be installed. The initial VANET will be set up in collaboration with the local government of a major city or metropolitan area. The local government will be happy to engage such a project as the VANET will provide two important civil services: (a) telematics services for intelligent transportation systems, (b) vehicle mobile internet (VMI) service for the government and the general public. Initially, the only VANET vehicles will be buses and government vehicles. Later, taxis and private vehicles will be added.

In its final form, the Free-Air business model will become a new breed of MVNO (mobile virtual network operator). In the traditional MVNO model, the operator offers voice and data services. In the Free-Air model, only wireless data bandwidth (both free and fee-based) will be provided. Free-Air will be able to offer to its members numerous and highly diverse applications such as VoIP, IPTV, VMI, headline news, e-commerce, e-entertainment, etc. through 3rd party vendors. The types of services and applications offered through Free-Air will be unlimited as long as they can be enabled through a mobile terminal. In this sense, a Free-Air operator is a diversified communications provider.

At home or corporate sites, Free-Air provides Wi-Fi bandwidths that piggyback on the broadband connections subscribed by home owners and corporations, similar to femtocell services provided by carriers. On the street and commercial premises, Free-Air provides free Wi-Fi bandwidths shared by merchants. Inside a vehicle, Free-Air provides fee-based VMI using a VANET. Only in the country side or non-Free-Air zones, Free-Air provides fee-based bandwidths through a 3rd party carrier infrastructure.

DETAILED DESCRIPTION OF THE PRESENT INVENTION

I. Pure VANET

The present invention solves three problems of a pure VANET: long per-hop delay, large number of hops in a round trip, control and management without centralized infrastructure. The key concept is virtual circuit (VC) routing and distributed DHT-based algorithm.

In the rest of this section, a VANET node will be used interchangeably with a VANET vehicle. To simplify the description, a VANET node will also be referred to as a node.

Definition of Virtual Circuit

There is a fundamental difference between a virtual circuit in a fixed network and a virtual circuit in a pure VANET. In the classical ATM (asynchronous transfer mode) technology, a virtual circuit (VC) is a fixed path between a source and a destination node. This path is fixed and is never changed starting at the time of set up until the time of tear down. Further, a VC is tied to its source and destination end points. Thus, a VC is identified by both the path and the two end points. In the IP world, however, a connection is only identified by the two end points, and there is no dependence on the path.

In accordance with one aspect of the present invention, a VC is only identified by its path, but not the end points. This makes sense as a VC now serves only as a path identifier, but not a connection identifier. To identify a connection, one has to go to layer 3 and layer 4—in the IP world, a connection is identified by the source IP address, source port number, the destination IP address, and the destination port number. Therefore, it is important to realize that a VC is strictly a path concept.

It is also important to realize that in a VANET, a connection's packets will travel in different paths at different times. The reason is simple: all nodes are mobile—as nodes move paths will change. Therefore, it is critical to differentiate between a path and a connection. In this invention, a VC is strictly a path concept.

In accordance with one aspect of the present invention, a VC is conceptually equivalent to a travel path of packets. A design principle of the present invention is that packet flows and traffic flow are parallel (or anti-parallel). Thus, a VC will be tied to geographical locations, called zones. Therefore, a VC is a packet path between two zones. Further, a complete packet path between two end points can be broken into multiple sub-paths. Therefore, a complete packet path between a source and a destination may be comprised of a sequence of VCs (packet sub-paths).

Virtual Circuit Routing

In accordance with one aspect of the present invention, a virtual circuit is tied to a zoning scheme of street or highway maps in which a pure VANET is operating.

Figure 1:
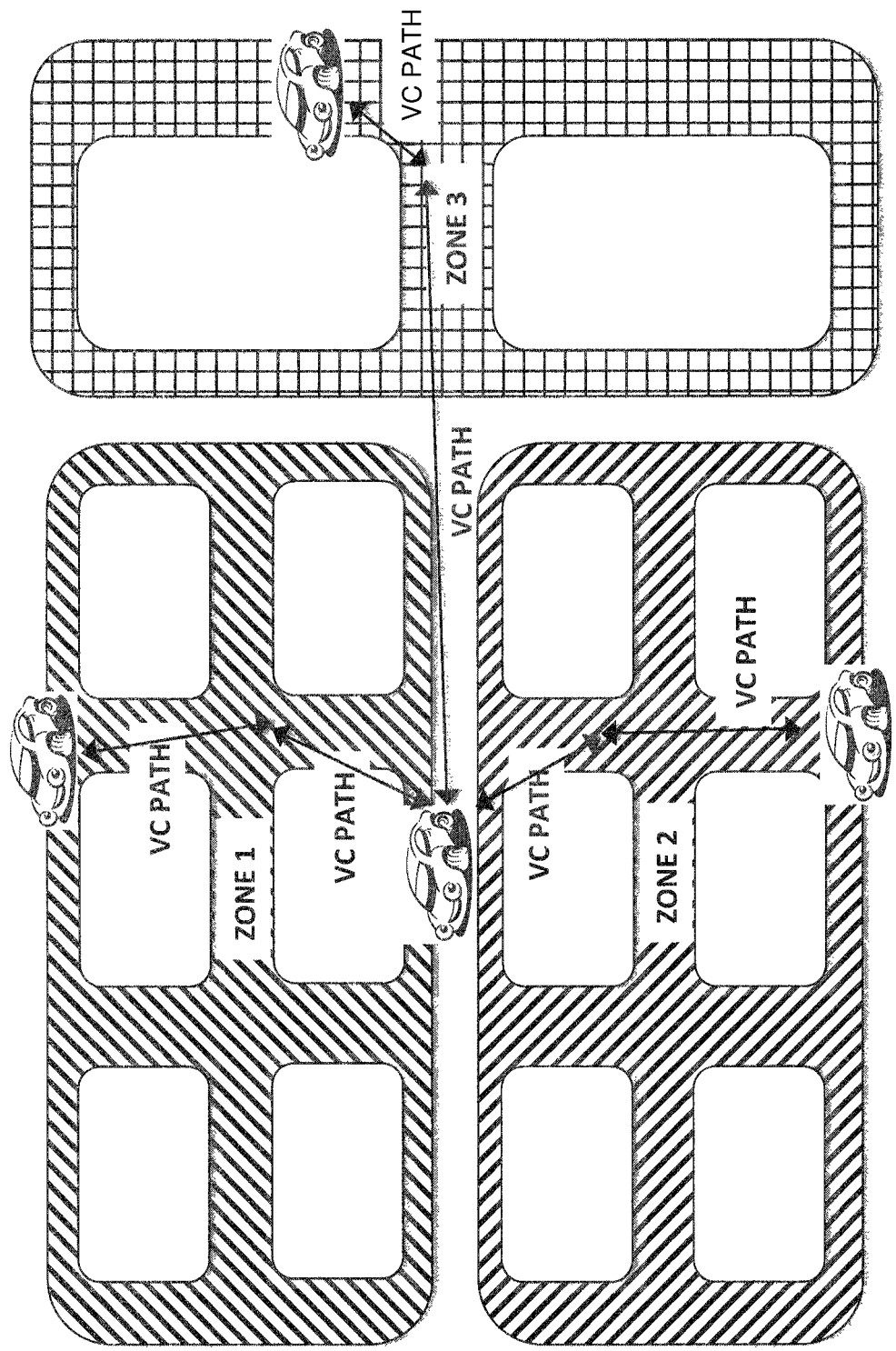
FIG. 1 shows virtual circuit in a zone setting.

In this technology, a virtual circuit is set up between two zones. A zone is characterized by the set of its defining border points, which are often street junctions. A virtual circuit can be set up between two border points of two zones. This is illustrated in FIG. 1. Multiple VCs can be set up between two zones. A virtual circuit is properly defined as a sequence of nodes—besides the starting node and the ending node, the rest of the nodes are relay nodes. In FIG. 1, the relay nodes are not shown, but they are implied. Note that a starting node may not be the source of a connection and an ending node may not be the destination of the connection. The starting node and end point of a VC are simply defining the VC.

A virtual circuit will operate at layer 2, as a service to layer 3—similar to ATM virtual circuits as a service at layer-2 to IP layer 3. At layer 2, all data frames will carry a virtual circuit ID.

In accordance with one aspect of the present invention, there are two ways to implement a virtual circuit at layer 2. The first method is to deploy an ATM layer between the MAC layer and layer 3. This is accomplished by inserting an ATM adaptation layer at the starting and the ending nodes of a VC, and an ATM layer at all the nodes of a VC. As ATM is an existing technology, no further details will be given.

The second method is based on implicit ATM layering. In this method, no explicit ATM layers will be inserted. Each data frame at the MAC layer is treated as an equivalent "ATM frame." Each frame will be identified with a VC ID at layer 2, called VCID. In this method, an IP packet is broken into data frames, which resemble ATM frames or cells.

In the second method, from one hop to the next, there is no need to modify data frames in transit. All data frames belonging to the same virtual circuit will carry the same VCID. Upon receiving a data frame in transit, a VANET node will look up the VCID from the frame and will use the VCID to retrieve the identifier of the outgoing (or next) channel to transmit the frame, from a VC routing table. After getting the next channel identity, the transiting data frame is sent to the appropriate transmitter, without being modified. This way, no layer-3 operations are performed on a transit frame. The only layer-2 operations are to read the VCID and to retrieve appropriate output channel identifier. Thus, the amount of processing is minimized.

Note that in regular Wi-Fi layer 2, a data frame will carry the transmitting node MAC address, the receiving node MAC address, and SSID (service set ID). In accordance with one aspect of the present invention, there is no need to carry all these identifiers for the VANET data frames. The routing table will be able to tell the local node that receives a frame the following for each VCID: (a) if the current node is a relay node, or a starting node, or an ending node, (b) if the received data frame is to be transmitted at an outgoing channel, which channel the frame should go to.

It should also be noted that in a regular VANET service, a telematics box is also a Wi-Fi access point (AP) to handheld devices inside or around the vehicle. For data frames between the handheld devices and the in-vehicle AP, the regular SSID, source MAC address, and destination MAC address will be needed.

Returning to the description of the VANET data frames, a non-transit data frame will require more processing. By definition, a non-transit data frame is either a data frame at the starting node of a VC, or a data frame at the ending node of a VC. At a starting node, per-hop delay is mainly comprised of the transmitting time; at an ending node, per-hop delay is mainly comprised of the receiving time.

For transit data frames, per-hop delay is the sum of receiving time, layer-2 processing time, and the transmitting time. Note that, due to the VC design, there is no layer-3 processing delay. The layer-2 processing delay is comprised of the VCID lookup time, and the time to retrieve the next channel identifier. The layer-2 processing delay can be shortened by using hardware assist. The transmitting time and receiving time can be shortened by having smaller data frames (smaller payload in the data frames). In a pure VANET, bandwidth is relatively abundant—the raw bandwidth of a regular 802.11 a/b/g channel is 54 mbps. Therefore, a good way to minimize per-hop delay is to reduce the payload size in a data frame. There is a tradeoff here: as payload size is reduced, the data frame header size as a percentage of the entire data frame is increased. Thus, as long as bandwidth is relatively abundant, and reducing per-hop delay is critical enough, one can choose a relatively small payload per data frame.

In sum, the method to reduce per-hop delay is by reducing the payload size in data frames, by using hardware assist in layer-2 processing, or both.

Hop Minimization Through Broadcast

One way to reduce the number of hops between two end points is to skip some nodes in routing packets. This is possible due to the broadcast nature of all wireless communication and Wi-Fi is no exception. Thus, a relay node (one hop in the path from a source to a destination) does not have to be an immediate neighboring node; some VANET nodes can be skipped. The hop minimization method is coupled with secondary packet/frame delivery technology.

The basic idea here is the distance between a transmitting node and a receiving node (be it a relay node or an ending node of a VC) should be maximized, subject to a minimum bandwidth requirement. As the distance between a transmitting node and its receiving node is increased, the available bandwidth is also dropped. Beyond a certain distance threshold, the effective bandwidth will drop below a minimally required value. Thus, in selecting a relay node, the distance should be increased up to a threshold value. The detailed method of selecting a relay node will be covered in the description for VC establishment.

VC Establishment Method

The issue here is determination of the nodes (starting, relay, and ending) of a VC, by modifying the routing tables. A routing table is comprised of records, and each record is an order set: [VCID, node_status, next_channel_ID]. The node_status field will tell if the current node is a relay node, a starting node, or an ending node of the VC with the ID equal to VCID.

The next_channel_ID field will indicate which channel to transmit a data frame. In addition, each node keeps track of two variables: its location given in terms of the subzone ID, and its traffic load (sum total of all the VCs that the current node is carrying traffic for.)

The selection of the nodes in a VC is aided by the GPS locations of the nodes. In accordance with one aspect of the present invention, a VC is most conveniently defined by a linear zone (a strip) along a street or a highway. The entire strip is divided into subzone 1, subzone 2, . . . , subzone k, wherein subzone k is the ending subzone, and subzone 1 is the starting zone. All nodes within a subzone moving on the same side of the street or highway will be a candidate for nodes in the VC. The selection can be (a) randomly chosen, or (b) dependent on the packet traffic load, or (c) dependent on the GSP locations within a subzone.

In a VANET, a node is mobile. Once a VC is established, it may need to be modified for two reasons. First, some nodes in the VC may simply leave the VANET. Second, as node moves, a node may have moved from one subzone to the next (the VC node membership of the node has to change then).

Routing Table Update

To determine and to update the routing tables in each node, all the nodes together run a distributed algorithm. This distributed algorithm accomplishes the following: (a) updating the current subzone position for each node, (b) detection of a node in a VC has left the VANET, (c) selection of a new node in the VC that has change in its nodes, (d) determination of the channel number for each node in each VC, (e) updating the routing tables according to the changes in the VC nodes, and (f) setting up or tearing down a VC.

Figure 2:
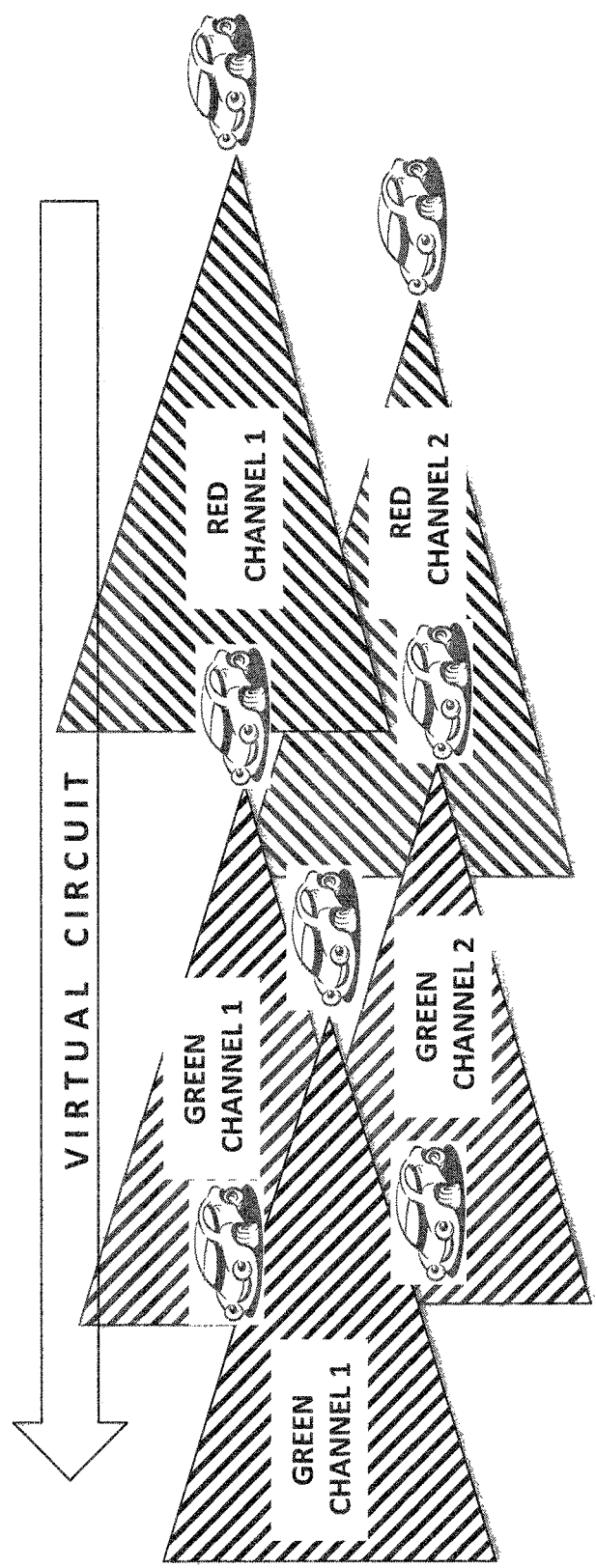
FIG. 2 shows a channel assignment in a virtual circuit in the direction of a highway.
Figure 3:
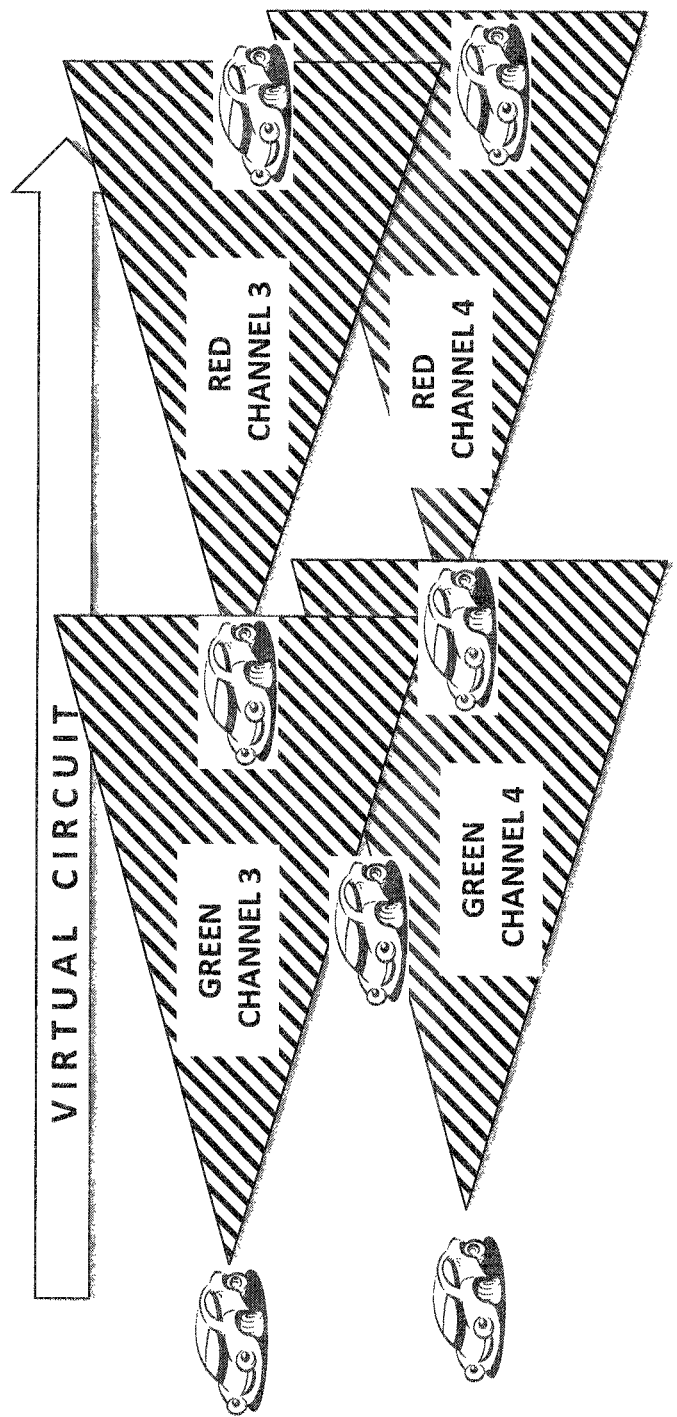
FIG. 3 shows a channel assignment in a virtual circuit in the opposite direction of a highway.

Further, it is possible to have 2 or more VCs having overlapping subzones. In this case, orthogonal channel assignments between overlapping transmission ranges between neighboring nodes have to be accomplished. In accordance with one aspect of the present invention, exactly 2 VCs can have overlapping subzones on the same side of a street or highway. FIG. 2 and FIG. 3 illustrate the assignment of orthogonal channels. In FIG. 2, green channel 1 and red channel 1 are the assigned channels for one VC; green channel 2 and red channel 2 are the assigned channels for another VC. In FIG. 3, green channel 3 and red channel 3 are the assigned channels for one VC; green channel 4 and red channel 4 are the assigned channels for another VC.

Pure P2P (Peer to Peer) Assignment of IP Addresses

In order to locate the subzone in which a node is located at layer 3, the present invention uses an IP address assignment scheme that creates a 1-1 (one-on-one) correspondence between the IP address of a node and the subzone in which it is located. This is possible because the entire pure VANET is an intranet. The IP address can be assigned using either IPv6 or IPv4 format. This way, the IP address of a VANET node will approximately reflect the GPS coordinates of the VANET node. The correspondence is created using a specialized (left unspecified in this application) mapping between a subzone with its GPS coordinate and the IP addresses in the subzone.

To avoid IP address conflicts, the assignment has to be done in a distributed and consistent manner. Since the IP address has a 1-1 correspondence between the subzone in which a node is residing and the node's IP address, checking of conflicts is accomplished by the nodes within the same subzone communicating with one another.

Each node will keep track of all the active IP addresses in the subzone in which it resides. Thus, each node will maintain a table of active IP addresses in the subzone it is located. These tables at the nodes are updated by using a distributed hash table (DHT) algorithm. In a sense, each node is a virtual DHCP (dynamic host configuration protocol) server. As a result of using the DHT algorithm, the assignment is done in a P2P manner.

Pure P2P Storage and Lookup for IP Addresses

To enable routing, a remote node needs to find the IP address of the destination node it intends to communicate with. This can be done according to a P2P-based SIP (session initiation protocol) or a P2P-based IP address lookup scheme. In accordance with one aspect of the present invention, a DHT-based algorithm is used to store the mapping between the node identifiers and the node IP addresses in a pure VANET.

In this technology, a remote node will use a node identifier as a key to retrieve the IP address stored in the global (in the sense of the entire pure VAN ET) distributed IP address database implemented via the DHT algorithm.

Secondary Packet Delivery in Case a Relay Node Disconnect from the VANET

In this technology, a block of data frames is also assigned with a block ID. Within the same subzone, a VC has one primary relay node and at least a secondary (backup) relay node. By utilizing the broadcast nature of wireless transmission, both the primary and secondary relay nodes will receive the same block of transmitted data frames. If the primary relay node fails to forward (send after receiving) the received block within a time limit, the secondary relay node will retransmit the same block.

II. Optimal Routing and Incentives in VANET

Antenna Infrastructure:

In accordance with one aspect of the present invention, each VINET node is equipped with a multi-ratio antenna system mounted on the rooftop of the vehicle. The antenna system is multi-radio and extended-ranged, while the antennas can be either directional or omni-directional. Each antenna could also be part of a multi-input multi-output (MIMO) antenna system.

A typical setup may have 4 antennas, but this is not a restriction of the invention. A VINET node will be hereafter referred to simply as a V-node. On the other hand, a fixed base station at roadside in a VINET will be referred to as an R-node.

Each radio can be configured to be either half-duplex (used for only transmitting or only receiving) or full-duplex (used for both transmitting and receiving, but not at the same time).

According to one aspect of the present invention, in a typical setup, the radios are configured according to the changing environments using software. Three different configurations are described as follows.

The first configuration is suitable for a vehicle on a single arterial road or highway. In this configuration, 2 antennas are used as transmitters, and 2 others are used as receivers. Thus, each V-node can receive and transmit at the same time. The first channel called FT (forward/front transmit) is to send to the front of the vehicle, and the second channel called BT (backward/back transmit) is to send to back of the vehicle. The third channel called FR (forward/front receive) is to receive from the front, and the 4th channel called BR (backward/back receive) is to receive from the back. With this design, there are no channels assigned to communicate with a vehicle on the side. Thus, this configuration is most suitable for a single arterial road or highway. In this configuration, FT and BT antennas are preferably directional, and FR and BR are preferably omni-directional.

The second configuration is suitable for grid roads. In this configuration, there are 4 radios, and each of 4 radios is configured to transmit and to receive (at different time, as being control by software). On a grid road, a vehicle can often come to a junction with 2 or more roads crossing each other. Thus, a vehicle may need to turn and still be connected continuously. In this case, the 4 radios are divided to communicate with other V-nodes or a roadside AP (R-node) on all 4 sides: front, back, right and left. A preferred antenna configuration is comprised of 2 half-duplex transmitting antennas and 2 full-duplex antennas. The 2 half-duplex transmitting antennas are used as FT and BT, and the other 2 full-duplex antennas are configured to send and receive from all around the vehicle. In this configuration, the half-duplex antennas are preferably directional, and the full-duplex antennas are preferably omni-directional.

The 3rd configuration is completely symmetric. Each antenna is full-duplex. The horizontal space is divided into 4 quarters: front, back, right and left. Each quarter occupies 90 degrees of the 360 degrees of a circle. The antenna responsible for front-quarter transmit and receive is called FTR; the antenna responsible for back-quarter transmit and receive is called BTR; the antenna responsible for right-quarter transmit and receive is called RTR; and the antenna responsible for left-quarter transmit and receive is called LTR. In this configuration, all antennas can be directional or omni-directional.

Next, the antenna structure of roadside base stations (R-nodes), which are called APs (access points), is described. An AP is connected through a broadband channel to the Internet—often the broadband channel is a fixed wire (copper or fiber). Each AP is equipped with at least 2 antennas, and each functions as an omni-directional extended-range radio. The most suitable place for an AP is at a junction in a grid road system.

Moving Base Stations:

By definition, a VANET is an ad hoc network, implying that the Wi-Fi devices form a single service set, and each node (V- or R-) uses the same channel to communicate with one another. However, this setup has numerous problems. First, as all nodes are on the same channel, there is a great potential of RF interference. Second, as all nodes are peers, network management is difficult. For example, security issues are hard to manage in a P2P (peer-to-peer) network. Third, it requires all nodes to be configured in the ad hoc mode. This makes it impossible for a handset to be connected to a VANET, as all known handsets are forbidden to operate in the ad hoc mode, due to business reasons—this is a severe drawback of the ad hoc setup. Forth, the P2P setup assumes a point-to-point topology of the network. However, this assumption fundamentally conflicts with the properties of radio communication. In all RF communication, all data are broadcast and every node can hear if it is in range of the transmitter. The infrastructure mode, on the other hand, exploits the broadcast nature of radio communication. Thus, in accordance with one aspect of the present invention, all (V- and R-) nodes operate in the infrastructure mode. Each V-node is configured as a Wi-Fi base station (BS) or a Wi-Fi client, or both at the same time. To avoid confusion, only a V-node is called a BS and only an R-node is called an AP.

Therefore, each V-node is a moving base station in a VINET, while each AP is a fixed base station.

Relative Topology:

Using the infrastructure mode, a VINET behaves almost like a fixed network, except that the topology is comprised of two kinds of nodes. The V-nodes are moving BSs and the R-nodes are fixed APs. At any moment in time, the entire set of the V-nodes and R-nodes form the absolute topology of an interconnected network, which is no longer a single or interconnected ad doc networks.

Under the condition that all V-nodes moving on the same road have zero relative velocity, the subset of all V-nodes on the same street form a relative topology that does not change in time. In a VINET, packets from and to nodes inside a subset of a "fixed" relative topology are restricted to routed thorough nodes in this subset of V nodes and bordering (V- or R-) nodes. Thus, for these packets, the only relevant topology is the fixed relative topology plus the bordering nodes. Thus, all V2V packet flows need only consider the relative topologies. In this way, the complex routing problem of an entire VINET is decomposed into "independent" routing problems associated with individual relative topologies. Note that a relative topology may have a lattice structure as it is the topology of V-nodes on the same street or highway.

Principle of Parallel Flows:

There are yet other advantages of this concept of relative topology. There are two cases to consider: downstream packet flows and upstream packet flows. The direction of reference is relative to the Internet. Thus, a downstream flow refers to a packet flow from the Internet to a V-node, and an upstream flow refers to a packet flow from a V-node to the Internet.

For upstream flows, it does not make sense to send packets in opposite direction of the vehicle movement. The reason is that the purpose of upstream flows is to send packets to a roadside AP. Therefore, the natural choice of an intended AP is one that a V-node is approaching. It does not make sense to send packets to an AP which is behind the forward moving vehicle. If packets are sent in opposite direction of the vehicle movement, then the intended AP is moving away from the sender. Thus, after some time, the intended AP becomes impossible to connect, and a forced handover must occur. Thus, for upstream flows, the packet flows must be in the parallel direction of the traffic flow.

On the other hand, for downstream flows, the situation is similar. The best intended AP to receive packets is still one that a V-node is moving to. Thus, for downstream flows, the packet flows should be in the anti-parallel direction of the traffic flow.

Another consideration is that RF signals are attenuated if there are obstructing objects between transmitters and receivers. Packets should travel in clear line-of-sight manner from hop to hop. This also implies that packet flows and traffic flow should be in parallel.

Therefore, in accordance with one aspect of the present invention, routing is designed by following the guideline that downstream flows are in anti-parallel direction of the traffic flows and upstream flows are in the parallel direction of the traffic flows. This guideline is called the principle of parallel (packet-traffic) flows.

To solve the complete routing problem, one has to find the routes for V2R (or R2V, which is subsumed in the case of V2R) flows. In this case, one has to consider a partial absolute topology comprising of a fixed relative topology with nearby roadside APs. These routes will remain valid as long as the principle of parallel flows is not violated. However, as the nodes in a relative topology will move over time, and the fixed APs never move, it is inevitable that packet flows must change their routes, as the originally intended AP may become impossible to connect. A handover must be conducted. Therefore, mobility (handovers from one intended receiver to a new intended receiver) is a fundamental issue in a VINET. In fact, mobility is a fundamental issue in all mobile communication networks, not just in a VINET or a VANET. The parallel flow principle helps greatly reduce the need for forced handovers.

Channel Assignment:

The next aspect of the present invention concerns channel assignment. One object of channel assignment is to minimize the number of hops a packet has to traverse in a VINET. Recall that each node is restricted to a limited number of antennas, and there are only a limited number of orthogonal channels at a frequency band. For example, 802.11a has 8 orthogonal channels. 802.11a has the advantage that it has more non-overlapping channels; but it has less range. However, due to fact that the 802.11a band is much less used than the band used by 802.11g/b, the actual range at high speed is actually bigger. In 802.11b/g, there are only 3 orthogonal (nonoverlapping) channels. It should be noted that a VINET is not restricted to using Wi-Fi technology for communication. Any short-range or medium-range small-cell wireless IP technology can be used. For example, WiMAX, LTE femtocell or picocell technology can also be used.

In accordance with one aspect of the present invention, all roadside APs are equipped with extended range omni-directional antennas. The reason for such an arrangement is that this ensures that the packets flows to and from a roadside AP remain in the same channel, even as a vehicle drives past the AP. Note that as a vehicle drives past an AP, the direction of a packet flow may change from being parallel to anti-parallel (or vice versa). Such changes cause inefficiency in the V2R routing. Thus, after a certain distance threshold has been reached, a forced handover must be conducted.

On a two-way street, the channels are assigned in such a way that the channels are orthogonal between the two opposing directions. For example, all V2V channels are divided into two orthogonal subsets: one subset for each direction. Thus, there will be no interference between packet flows in opposite directions of the traffic.

Subset Relative Topologies:

In accordance with one aspect of the present invention, to minimize hop counts, all the V-nodes on the same street are organized into disjoint subsets. Further, each disjoint subset is assigned a discrete color. Packets are forwarded from one colored subset to the next (from an individual V-node to a set of V-nodes). If a packet traverses 2 colored subset before arriving at a roadside AP, the number of hops this packet traverses in the VINET is 3. Furthermore, each subset of V-node forms a relative topology.

In general, each V-node within a colored subset will use identical channel assignments for packet transmissions and receptions. However, this is not a restriction.

A criterion to include a V-node into a subset is based on SNR (signal-to-noise ratio, sometimes also known as Eb/No). The principle is that each V-node within the same subset (also called group) hears each other so well that if they send to one another in the same channel, severe interference will occur. Another criterion to organize the nodes is based on distance. This organization of nodes is a function of the control plane of a VINET.

While there are multiple ways to organize subsets (groups) on the same street, the following method based on lattice topology is one possibility. In this method, all V-nodes on the same street in one direction are organized as having two colors: green or red. Green represents one layer, and red represents another layer. Thus, the entire topology of the V-nodes on the same street in one direction form a lattice of interleaving red and green layers.

Figure 4:
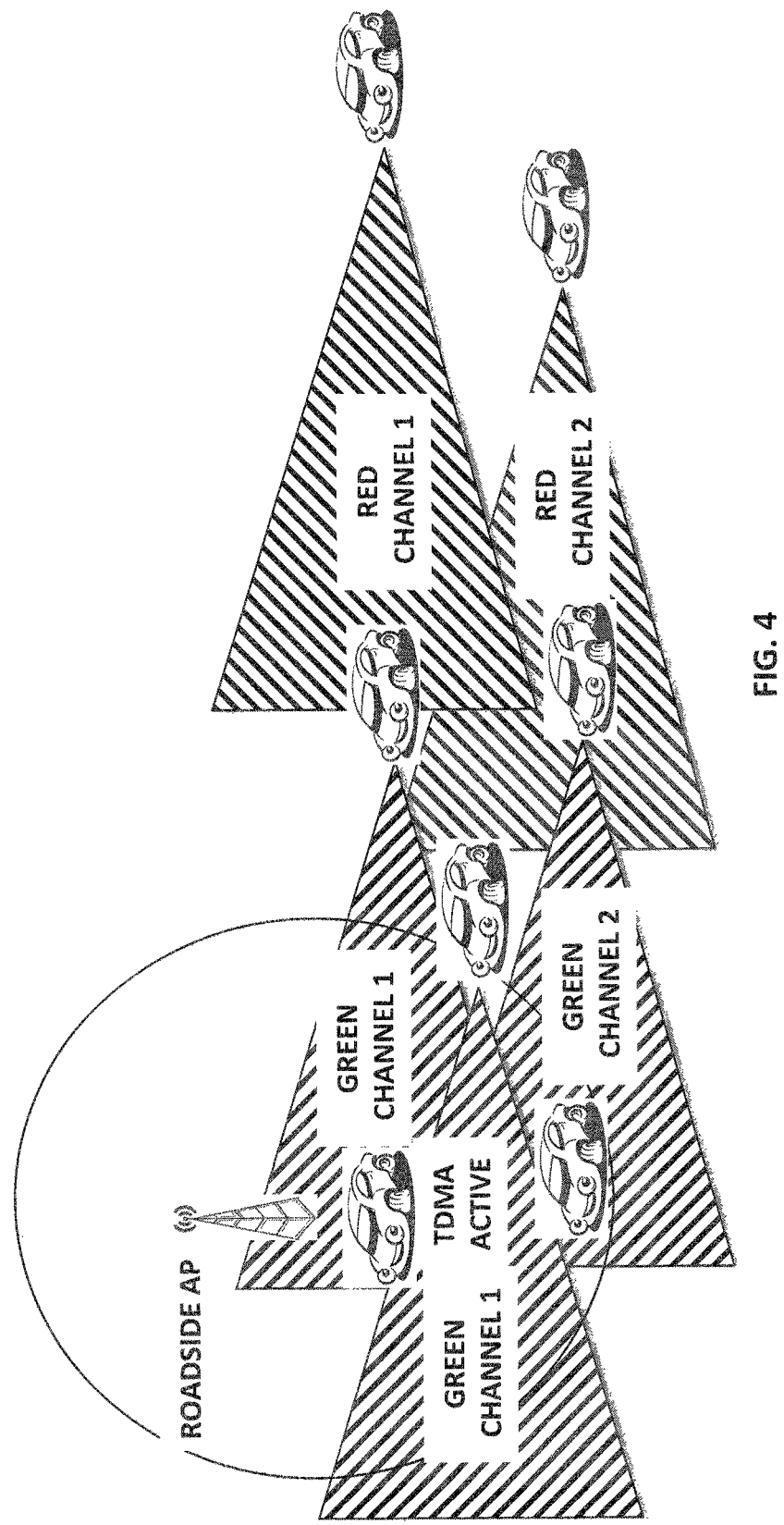
FIG. 4 shows a channel assignment in a red/green layer relative topology on a highway for uploading.
Figure 5:
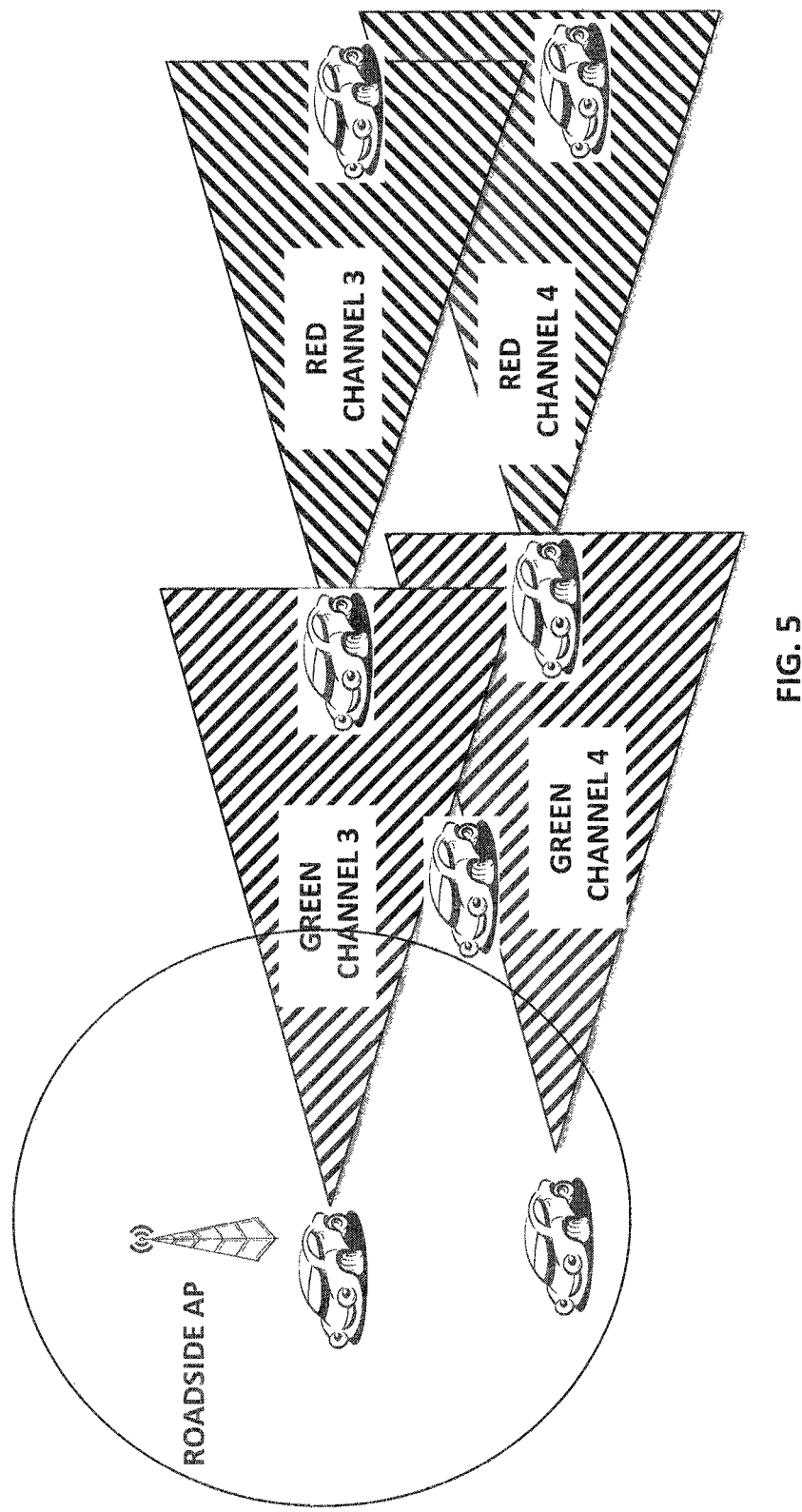
FIG. 5 shows a channel assignment in a red/green layer relative topology on a highway for downloading.

This arrangement is illustrated in FIG. 4 and FIG. 5. In FIG. 4, upstream packet flows are depicted along with the traffic flows. In FIG. 4, there are 2 cars in a green layer near the roadside AP, followed by a red layer of 3 cars. The red-layer cars use green channel 1 and green channel 2 to send packets to the front layer, which is green. Following the red layer is a second green layer of 2 cars. These 2 cars in the second green layers use red channel 1 and red channel 2 to send packets to the front layer, which is red.

FIG. 5 is similar except that only the downstream packet flows are shown. Now, the first green-layer cars use green channel 3 and green channel 4 to send packets to the back layer, which is red. The red-layer cars use red channel 3 and red channel 4 to send packets to the back layer, which is green.

Note that in this representative example (embodiment), red channel 1 and green channel 1 can be the same channel. The reason is that these two channels are all upstream channels and packets in the upstream channels are sent to an intended AP in a store-and-forward manner from layer to layer. Thus, since these packets are the same along the path, the sending and receiving can be (and should be) arranged to occur at different times. Similarly, red channel x can be the same as green channel x. Thus, if each layer has 2 forward channels and 2 backward channels and the street is 2-way, the total number of independent channels needed is only 4. Since there are at least 2 channels reserved for a roadside AP, there are still 2 more unused channels in the 802.11a band. Thus, in general, depending on the V-node density and the bandwidth requirements, the number of forward channels or backward channels per layer is limited to 3.

Thus, a packet will only travel from a red node to a green node or from a green node to a red node. A green node will send or receive packets in a green channel, and a red node will send or receive packets in a red channel. Thus, this relative topology has a lattice structure and routing is straightforward. Since all the paths are from red to green to red (and vice versa), no paths that will form a cycle. Thus, the classical looping problem of label correcting algorithms totally disappears.

Note that this layered topology approach totally transforms the routing problem from a classical shortest path problem to a rate assignment problem. The issue now is how to assign the rate to each available forward or backward channel. This problem is a special max-flow problem with a lattice structure. In accordance with one aspect of the present invention, the control plane of the VINET solves this problem for each relative topology which is defined by two separating APs on the same street or highway.

Yet another issue here is the problem of assigning layers (or subsets) in the decomposed topology approach. Obviously, if the sole object is to minimize hop counts in a VINET routing, then there should be only two layers, one green and one red. But this might not be feasible. If the distance between two separating APs on the same street is very far, then it is impossible for the V-nodes to communicate from one end of a street to the other end. Further, as many V-nodes may send to the same V-node, the chance of packet collisions will greatly increase. Therefore, the layer assignment problem is constrained by the antenna power and the distance between separating APs on the same street. This assignment should also depend on the V-node density on the same street. If the number of V-nodes is large, to reduce interference, it might be better to increase the number of layers. In this case, the VINET operator should install more APs on such a busy street.

According to one aspect of the present invention, the number of layers is roughly equal to distance between two separating APs on the same street divided by a distance parameter. This distance parameter is inversely proportional to bandwidth requirements in the V-nodes. This distance parameter is set to be small if the bandwidth requirements in the V-nodes are large; otherwise, the parameter is set to be large, to minimize hop counts.

TDMA to Avoid Packet Collisions

In the decomposed topology approach, it is possible that multiple senders could send to the same receiver; thus, packet collisions become highly possible. In the layered approach, green nodes never communicate directly with green nodes, and red nodes never directly communicate with red nodes. This method already reduces the chance of packet collisions.

According to one aspect of the present invention, to further reduce packet collisions, a TDMA reservation scheme is used. Recall that in the layered topology approach, each layer has up to 3 orthogonal channels for transmissions. Thus, a V-node functioning as a BS could have multiple V-nodes attaching to it as clients. Further, according to one aspect of the present invention, there could be multiple V-nodes in the same layer assigned to the same channel. Transmissions to these V-nodes with the same channel should be coordinated using a TDMA reservation scheme. Reasonable TDMA schemes can be used; one of which is an IP-TDMA scheme.

However, due to the fact that vehicles are moving, the delay between a BS and its clients may change over time, exotic schemes that try to maximize throughput are not advisable.

In a VINET, there is a separate control plane that performs reservation for packet/frame time slots. Since V2V delays change over time as vehicles move, the reservation scheme is based on chunks (or blocks) of packets (or frames), not a single packet (frame). Further, enough guard bands are to be used in between two neighboring blocks of transmission. This is done to avoid synchronization error.

The control plane that does the block reservation can either be in-band or out-band. In an in-band scheme, control packets (or frames) are sent in the same channel as the data channel. In an out-band scheme, control packets (or frames) are sent in a channel different from the data channel. The reservation can be based on polling, round robin, or contention.

The control plane also chooses which V-nodes are used as relay nodes. Since the number of independent channels is limited to 3, a simple policy is a random selection of up to 3 V-nodes in the same layer.

In addition, for downstream packet flows, a V-node can choose which relay nodes from a previous layer to send the downstream packets. If the V-node has enough antennas, the V-node should choose 2 or more relay nodes with different channels (in general, different relay nodes in the same layer should have independent channels). In this case, there will be no need for TDMA media access control to avoid packet collisions. This is the case depicted in FIG. 5.

Methods to Counter the Loss of Relay V-Nodes

A VINET is different from an ordinary cellular infrastructure. It is possible that a V-node can stop at any moment, or a V-node can move to another street or enter into a garage structure, causing changes in a relative topology. Thus, a relay node on a path from a source to a destination may suddenly disappear. To solve this problem, multi-path routing for the same IP connection (unicast, multicast, or anycast) will be used in a VINET. The mobility technology invented by the authors (under application for a US patent) can be used to realize multi-path packet delivery over the same IP connection.

In accordance with another aspect of the present invention, a reservation-n-rebroadcast scheme can also be used to recover lost packets. This scheme can be implemented either in conjunction with or without a TDMA link layer control.

In such a scheme, transmissions are reserved via reservation mini-frames. Each reservation mini-frame is a very short control frame that occupies slightly more than a few DIFS (DCF inter-frame space) intervals, where DCF is the distributed coordination function as defined in the 802.11 standards. There exist numerous reservation schemes in the public domain, for example, PCF (point coordination function), HCF (hybrid coordination function), etc. The reservation mini-frames can be arbitrated using a priority queuing scheme such as DFC, or polling, or round robin, or a hybrid.

Data frames are reserved in blocks: each transmitter can reserve a fixed block of data frames. However, the fixed size can vary: the actual size of a block may be indicated in the reservation mini-frames. Each block of data frames will be assigned a block ID, which is known to all the terminals and the base stations that can hear the reservation mini-frames and data frames. In a reservation mini-frame, a number of relay V-nodes are specified as backup rely node. These back-up relay node will use a timer to determine if a particular block of data frames is not transmitted within a timeout threshold. If a timeout event occurs, then the block of data frames is considered lost, then backup relay node making the detection will retransmit the block. The backup relay nodes are chosen so that it hears the original transmission of the data block; it stores the original transmitted data block and use it to retransmit when needed.

Note that the block ID is designed to be unique in all the radio transmissions from a source V-node all the way to a destination roadside AP (or from a source roadside AP to a destination V-node). Since this scheme is used in conjunction with a reservation scheme, there will be no duplication of block transmissions. To send a lost data block, a backup relay V-node has to make a reservation specifying the data block ID. Since all relay nodes will hear the reservation mini-frames, only one relay node will retransmit the lost data block.

Control Plane Functionalities

In accordance with one aspect of the present invention, there is a separate control plane for VINET management. The objectives of the control plane include: (a) maintaining topology tables (both the relative and absolute topologies), (2) maintaining IP address tables to enable V-nodes and R-nodes to find each other in terms of IP addresses, (3) channel assignment, (4) calculating potential trajectory of each V-node to start an anticipative handover. The control plane takes into account of the street topology, known through GPS (global position satellite) mappings and VINET topologies.

In accordance with one aspect of the present invention, a distributed hash table based store-and-retrieval algorithm is used to store the various tables: topology tables, IP address tables, tables of potential future V-nodes locations, etc. These tables can also be implemented in a centralized database system.

In particular, the control plane will trigger an anticipatory handover if the any of the following conditions is met:
(a) a V-node is moving towards an AP and is about to pass the AP;
(b) a V-node is exiting the current road and turning to another road;
(c) a V-node suddenly stops and breaks the relative topology in which it is a member;
(d) a V-node suddenly stops functioning as a V-node;
(e) a V-node changes its speed/location so much the relative topology in which it is a member no longer makes sense, a new subset membership has to be assigned to the changed V-node.

In addition, the IP address assignments for V-nodes are also performed by the control plane. As V-nodes may change their attachment points often, the classical DHCP (dynamic host configuration protocol) may not be used. One way is to assign IPv6 addresses to the V-nodes. However, this is not a restriction of the present invention.

Methods to Incentivize Sharing of Bandwidths

The present invention also provides incentives to motivate merchants and resides on roadsides to set up APs to share their broadband bandwidths. For merchants, one incentive is to force all displays of Internet devices using a V-node via a roadside AP for Internet connection to see advertisements of the merchants. For residents, one incentive is to provide free or reduced-fee membership in an MVNO (mobile virtual network operator) service to the residents. For example, this MVNO service could have a large coverage in many cities. Free or reduced-fee mobile VoIP (voice over IP) services can also be used as incentives to both merchants and residents.

III. P2P Mobile Virtual Network Operator Model and Routing

Obtaining critical mass is a crucial first step in establishing a social-network based MVNO. As taxi drivers are individual small-businessmen and they spend most of their time on the street, they represent most suitable subscribers for the P2P MVNO model.

In accordance with one aspect of the present invention, the P2P MVNO provides to taxi drivers four types of services: (a) call-center; (2) in-vehicle VoIP; (3) location-based assistance; (4) VMI. In the call-center service, the MVNO will automatically search and match a taxi-caller and a taxi driver. The calling for taxies can be accomplished in two ways: text-based or voice-based. In a text-based taxi calling, the text message is sent via the Internet, which is routed to the MVNO directly. In a voice-based calling, a voice recognition system will receive the phone call, and hook up a taxi driver on the street to directly to the caller.

Location-based assistance to the taxi includes: (a) traffic congestion information, (b) estimated travel time; (c) routing assistance; (c) auxiliary information at locations: items on sale in a special promotions at a store, phone number look-up at the destination, etc.

In accordance with one aspect of the present invention, free in-network IP-based services are used as incentives to recruit new subscriber to the P2P MVNO. Such in-network services may include VoIP, video conferencing over IP, select location-based services, etc.

In accordance with one aspect of the present invention, select CPE devices are also sold at cost or at low prices to subscribers. These consumer devices are preloaded with software that enables free in-network services. For example, a consumer CPE device with video conferencing over IP capability will enable free in-network video conferencing over IP for subscribers. Such incentives are effective tools for generating viral growth or snowballing effect of the social-networking business model for the P2P MVNO.

Revenue model for the P2P MVNO include monthly or periodic subscription fees for: (a) VMI, (b) Value-added service (e.g. call-Taxi service), (c) telematics services (location-based, safety related, traffic related, etc.), or (d) fixed or mobile VoIP, fixed or mobile HDTV/IPTV, fixed or mobile Internet service.

The P2P MVNO may also charge technology license fees for specialty software in mobile terminals such as smartphones, laptops, and MIDs, etc. In addition, technology license fees for specialty software in APs, gateway servers, VMI box installed in vehicles can also be charged. The specialty software may enable these devices to provide seamless handover, or bandwidth bonding, other functionalities.

Further, excess mobile bandwidth can be re-sold to carriers. A P2P MVNO can also receive income through advertisement in the CPE devices connected through the MVNO. Such devices may include the VMI-telematics box installed inside a vehicle, or a home/office box that is capable of providing video or voice conferencing over IP.

In accordance with one aspect of the present invention, a P2P MVNO is formed by piecing together 3 types of Wi-Fi mesh networks: (1) VANET, (2) fixed mesh networks on the street, and (3) ad hoc mesh network on the street. Such a network is called the composite mesh network. Possible types of individual networks that can be added include: (a) home/office Wi-Fi network, (b) home/office femtocell network, (c) home/office picocell networks, (d) VANETs, (d) home/office ad hoc Wi-Fi networks, (e) on-the-street ad hoc Wi-Fi networks.

In accordance with one aspect of the present invention, types of individual PCE that can be added to the composite mesh networks include: laptops, smartphones, PDAs (personal digital assistants), desktop PCs, MIDs, game machines, MPMs (portable media players), servers, Wi-Fi APs, etc. The only and common requirement for all these devices is that they are IP devices: they can be connected to an IP network, The devices in a composite mesh network can either be operating in an infrastructure mode or had hoc mode, as specified in the Wi-Fi standards or femtocell standards.

In accordance with one aspect of the present invention, a composite mesh network is also connected through vertical handover to carrier networks, including 3G, 4G (WiMAX/WiBro), LTE, HSPA plus, and any future carrier grade mobile data networks.

Figure 6:
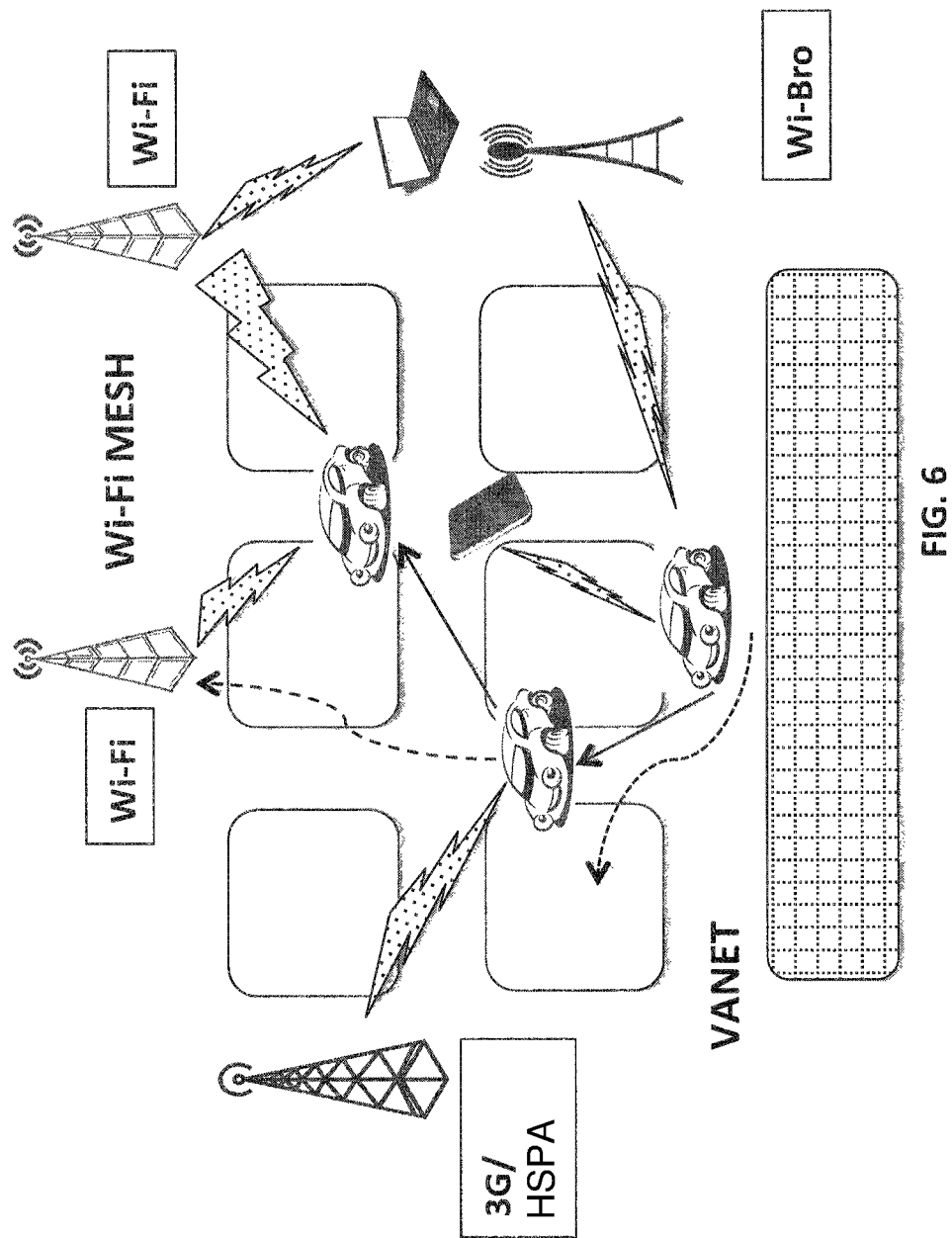
FIG. 6 shows a typical P2P composite mesh network with collaborating carrier APs.
Figure 7:
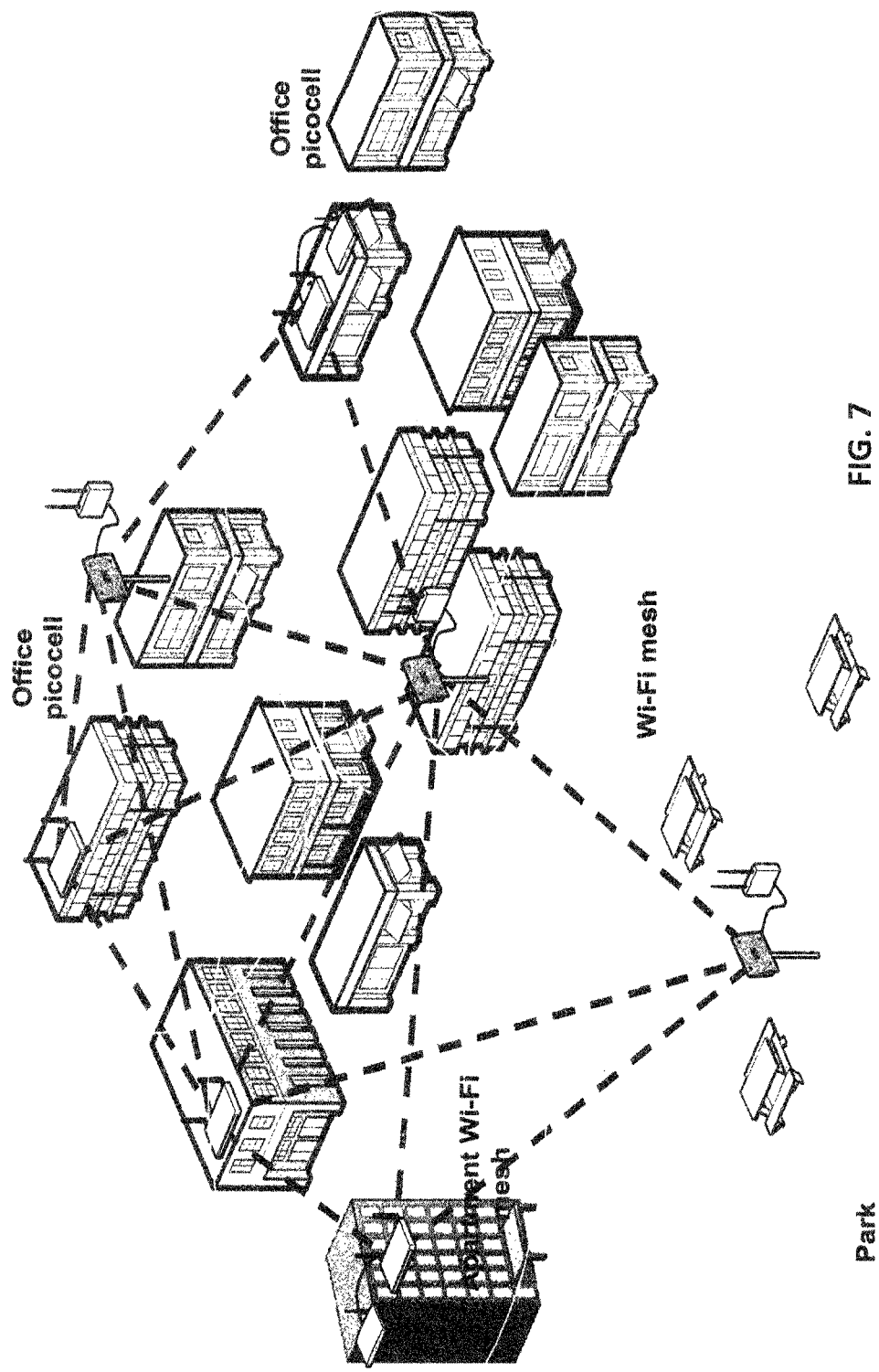
FIG. 7 shows a typical composite P2P mesh network in a metropolitan area.
Figure 8:
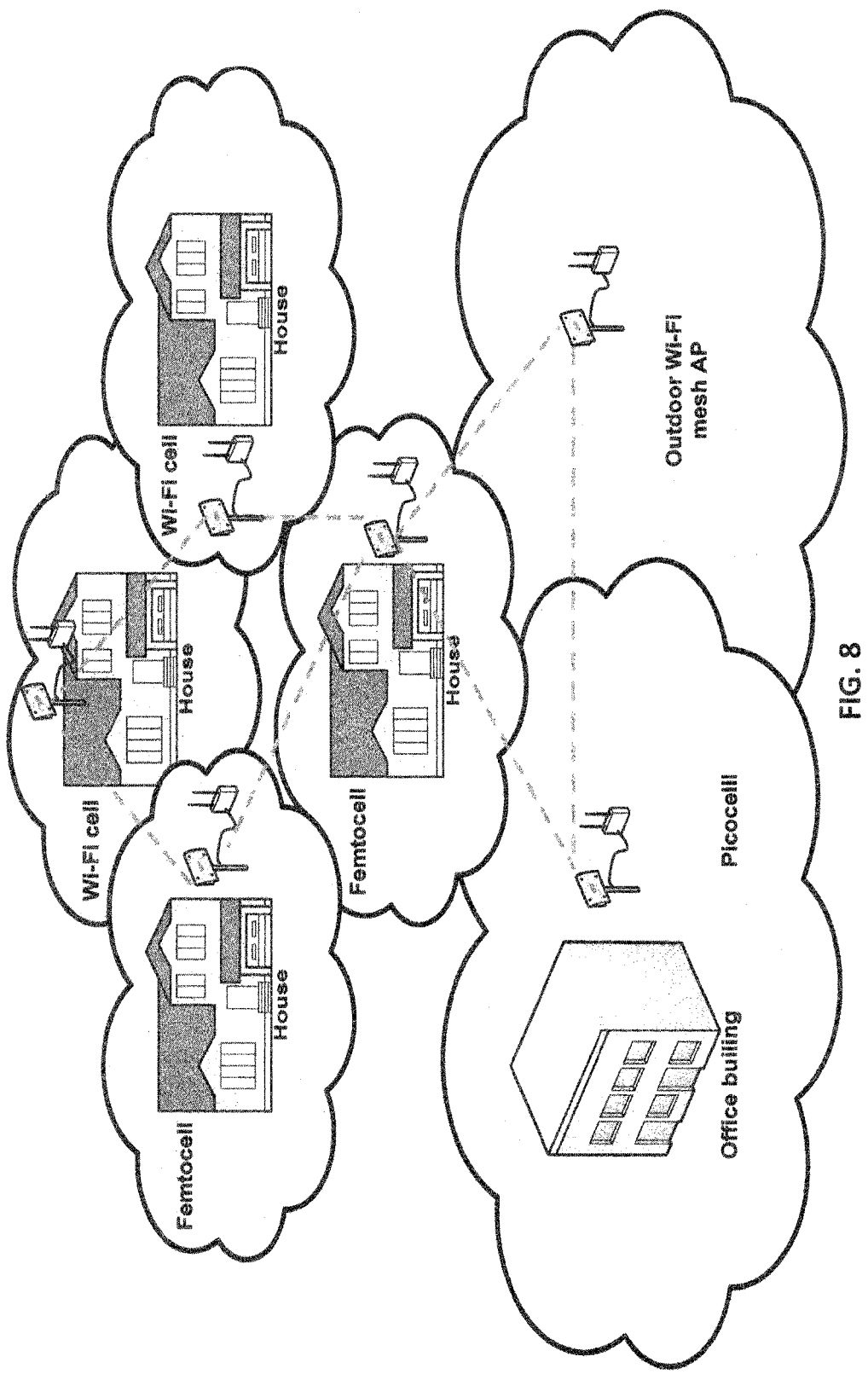
FIG. 8 shows a typical composite P2P mesh network in a rural area.

The combined carrier networks and a composite mesh network are called a composite P2P network. A composite network is illustrated in FIG. 6. A composite mesh network for a metropolitan area is illustrated in FIG. 7; while a composite mesh network in a rural area is illustrated in FIG. 8.

Figure 10:
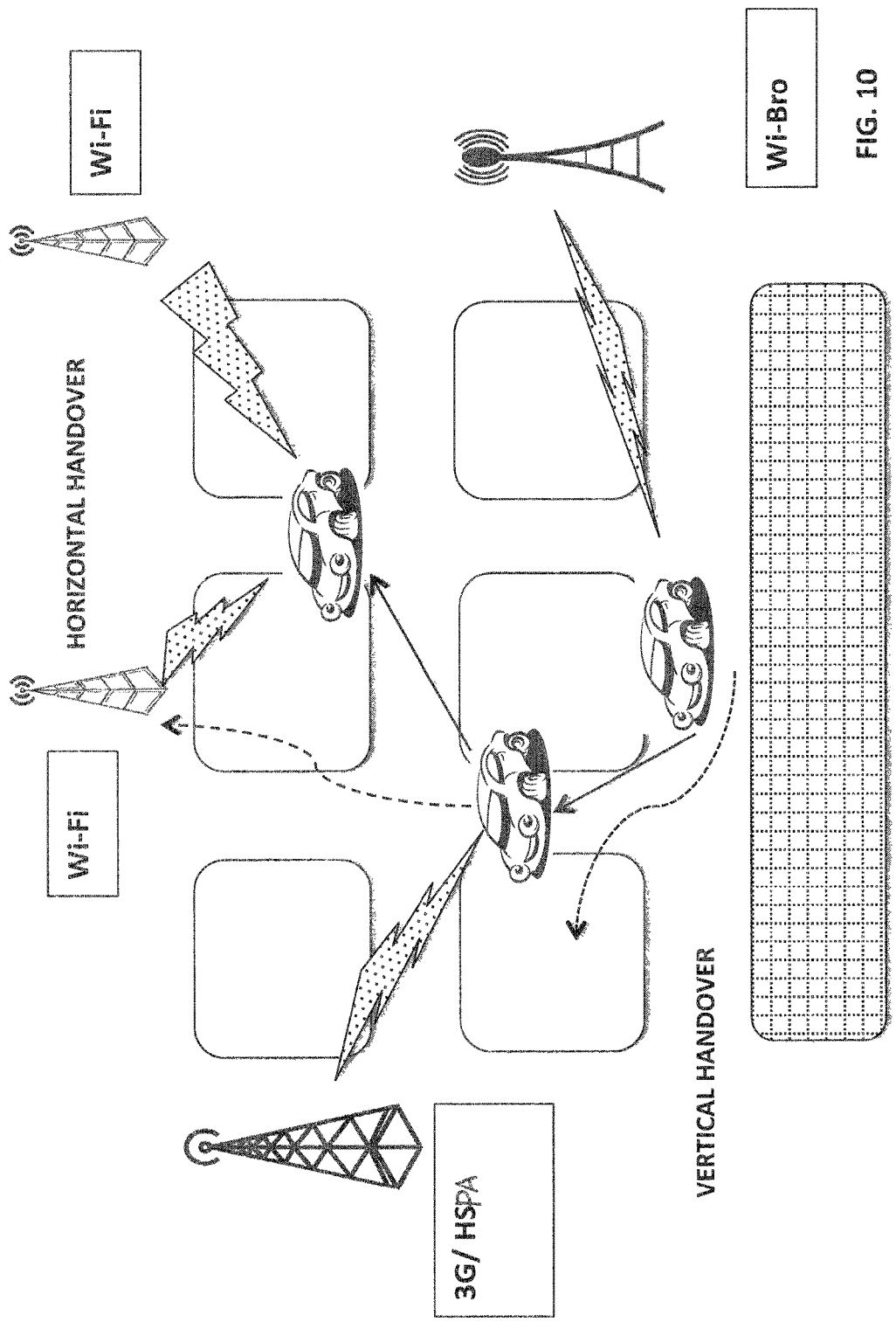
FIG. 10 shows vertical handover in a composite mesh-carrier network.

In a composite P2P networks, a mobile device may have to perform two kinds of handover: vertical (between different kinds of bandwidths) and horizontal (between the same kinds of bandwidth). These handovers are illustrated in FIG. 10.

Figure 9:
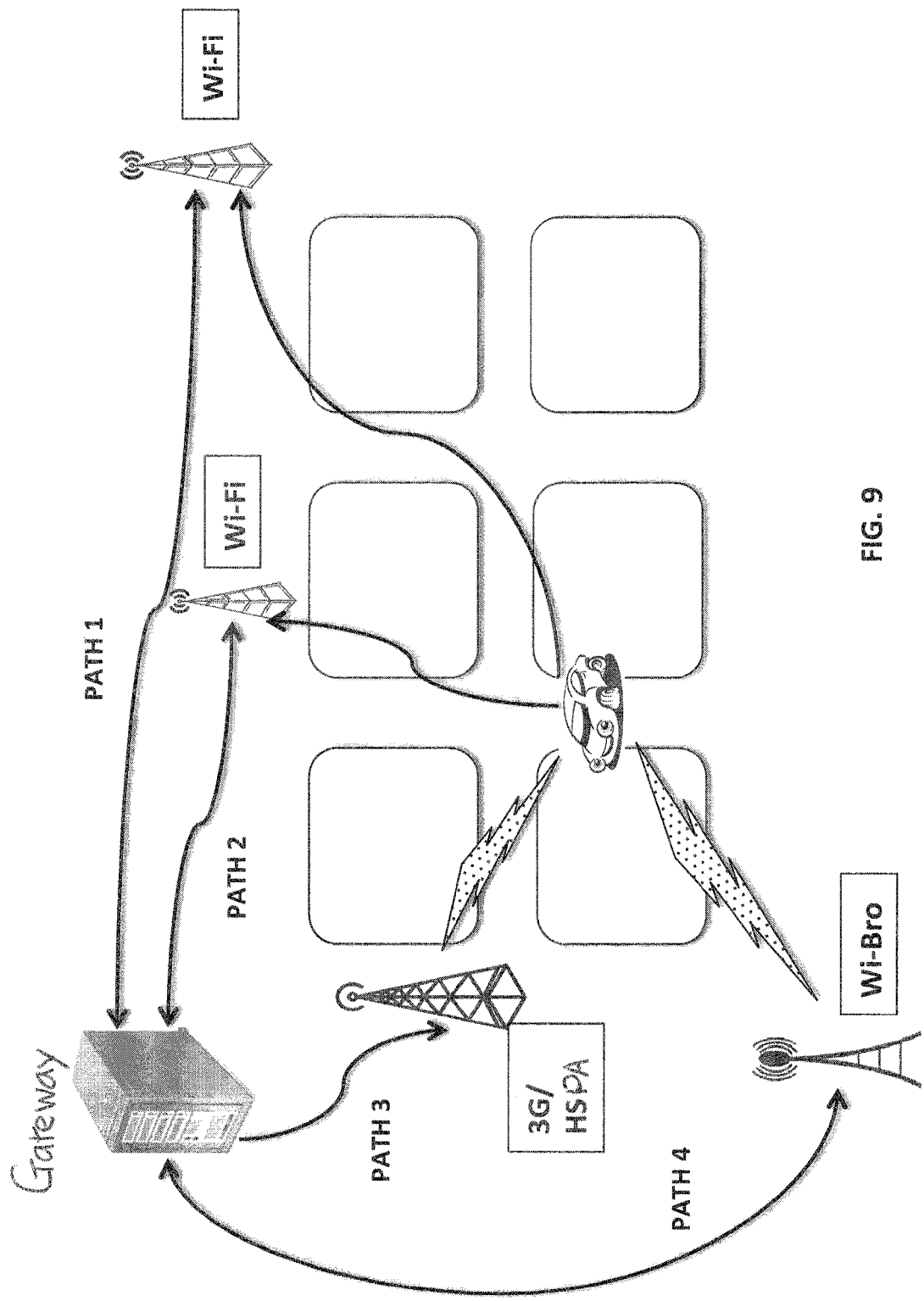
FIG. 9 shows bandwidth bonding in the composite mesh-carrier network.

In a composite P2P network, a device can utilize multiple bandwidths provided by different sub-networks in the composite P2P network. This is illustrated in FIG. 4, in which a car is connected via 4 paths to a gateway: path 1 and path 2 are connected via Wi-Fi APs, path 3 is connected via a 3G/HSPA cell tower, and path 4 is connected through a WiBro cell tower. A gateway is needed to achieve bandwidth bonding as the other end point of a unicast will only send packets to a single destination. The gateway will function as a proxy: the other end point will pump as many packets as possible to the gateway, and the gateway will distribute the packets unto the 4 paths to the mobile device, a car in FIG. 9.

In accordance with one aspect of the present invention, collision-free simultaneous transmissions at the same location is accomplished by assigning orthogonal channels to each pair of communications. It is important to first clearly define the terms for this multi-radio technology. First, it is assumed that all communications are direct and two ways. Therefore, a transmitter is also a receiver, and a receiver is also a transmitter. Each vehicle is assumed to be equipped with multi-radio directional antennas. A typical setup is that each vehicle has 4-radio directional antenna at the vehicle rooftop. Each transmitter-receiver pair is called a communication pair.

Figure 11:
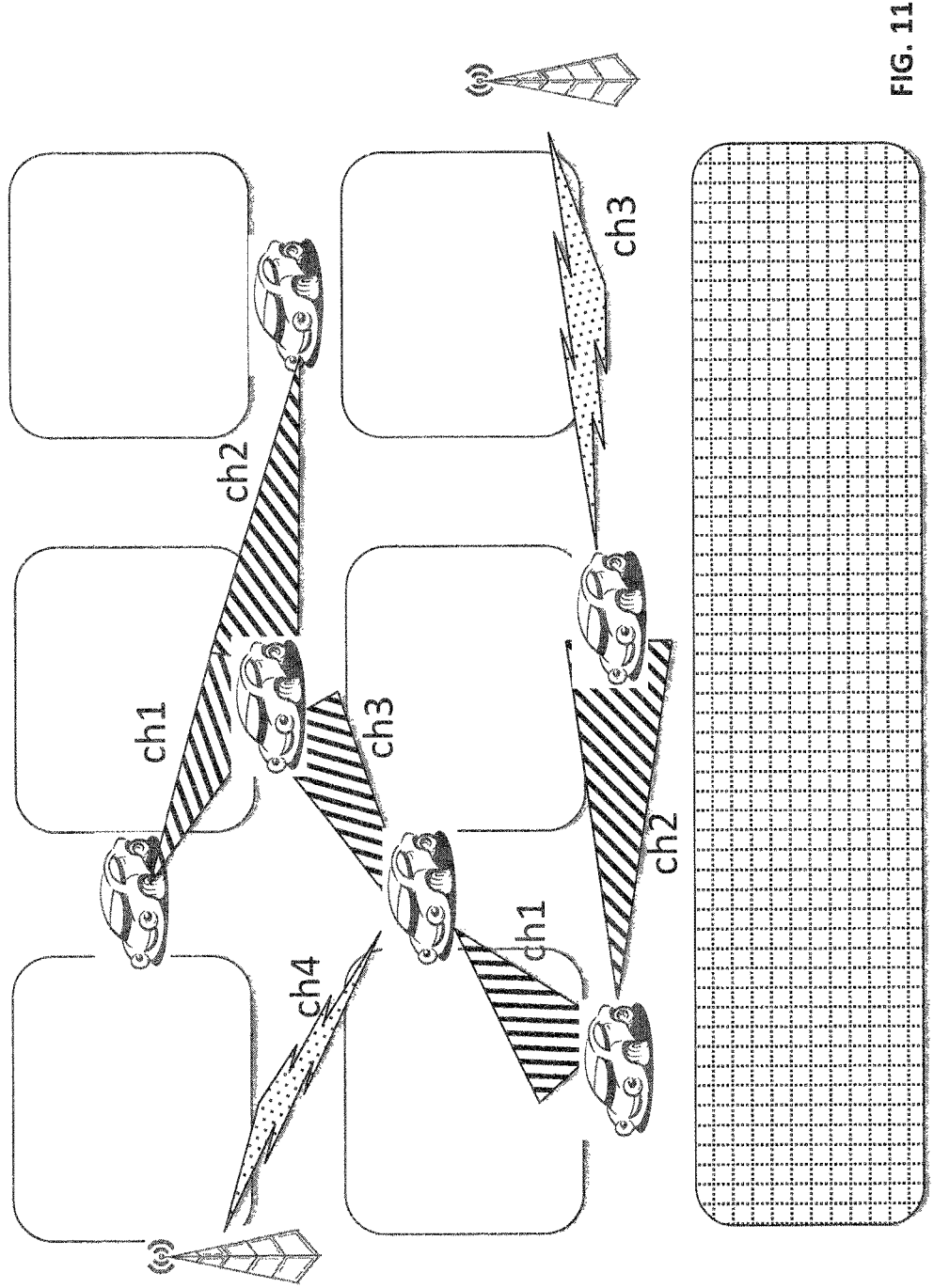
FIG. 11 shows orthogonal channel assignment in a composite mesh network.

On a two-way street, the admissible channels in one direction are orthogonal to the admissible channels on the other direction. For example, on an East-West bound highway, all East-bound vehicles are allowed to communicate using odd-numbered channels, while the West-bound vehicles are allowed only to communicate using even-number channels. An example of orthogonal channel assignment is illustrated in FIG. 11.

A simple heuristic which is adapted to the street traffic and topology is used to assign the channels. These channels are location constrained. For example, to communicate to a vehicle in front or back on a north-bound street, the channels allowed may be set to be in the set $\{2, 4\}$; but to communicate to a vehicle on the side, the channels allowed may be set to be in the set $\{6, 8\}$. These heuristics can be designed using machine learning, or fuzzy logic.

In addition, if at a cross-section, if there is a fixed roadside AP available, then for all vehicles within a short pre-defined distance from the cross-section, communications between vehicles may be dropped in favor of direct communications with the roadside AP.

In accordance with one aspect of the present invention, the channel assignment for communication pairs will be adapted as the topology on the street is changed. This process is called the channel adaptation algorithm. This algorithm takes into account of the street topology (known through the GPS mapping), and VANET topology.

In accordance with one aspect of the present invention, an explicit reservation scheme is also used when the channel assignment algorithm has deemed that non-conflict channel assignments are impossible. Explicit reservation scheme may involve IP-TDMA reservation schemes or RTS-CTS schemes.

In accordance with one aspect of the present invention, a topology scanning algorithm is enacted periodically to scan and store the neighboring mesh devices. These devices can be a VANET nodes or simply a CPE device. If any device in the composite mesh network is disconnected, the cached topology is used as the initialization for the restored network topology.

In accordance with one aspect of the present invention, a DHT-based distributed store-and-retrieval algorithm is used to store the IP addresses of the nodes in the composite mesh network. The DHT-based store-and-retrieval system actually implement a distributed database wherein a device ID can be used to as the keys to store and retrieve IP addresses, and other associated information.

In accordance with one aspect of the present invention, routing in a VANET is based on GPS coordinates or other geographical coordinates. The VANET map is divided into zones and routing is divided into zone-to-zone (Z2Z), vehicle-to-zone (V2Z), vehicle-to-vehicle (V2V), and vehicle-to roadside (V2R).

In accordance with one aspect of the present invention, virtual circuits (VCs) are set up so that IP packets assigned to a particular VC must travel in a particular sequence of nodes in an overlay network, which constitutes the path of the VC in the overlay network.

Figure 12:
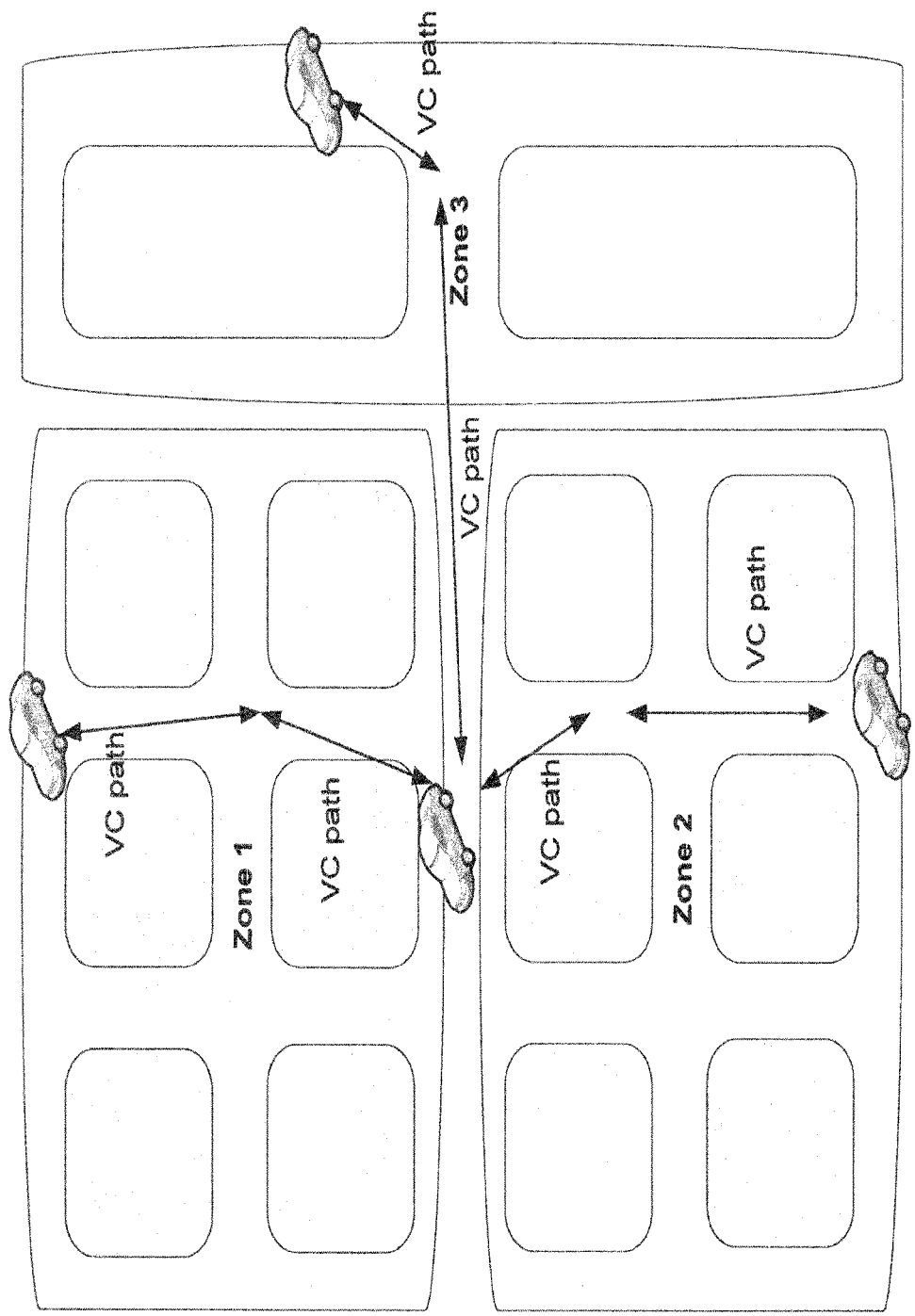
FIG. 12 illustrates the zone-based routing in a composite mesh network.

In accordance with one aspect of the present invention, packet delivery between a source and a destination is done through a sequence of VCs, going through V2Z, Z2Z and Z2V segments of the routes. This is illustrated in FIG. 12.

In accordance with one aspect of the present invention, the number of VCs from any vehicle to any zone is restricted to 4.

In accordance with one aspect of the present invention the VC to choose for routing strongly mostly depend on the street topology and the current VANET topology, and only weakly depend on the congestion on the VCs. In particular, packets flows in the VCs are chosen by the routing algorithm to make sure that packet flows parallel the traffic flows. For example, if a vehicle to is to determine a VC to reach a roadside AP which is situated in the north of the vehicle, then the VC should be chosen so that the current vehicle routing is in parallel to the packet flow. Ideally, the vehicle should be traveling toward the northern direction. If on the other hand, the vehicle is traveling in the Southern direction, then the routing algorithm will choose a roadside AP towards the South.

IV. Free Air

Strong Incentives to Acquire Handset Owners and Merchants as Customers

Ultimately, as a consumer approaches a location, either in a vehicle or by walking, ads from nearby merchants in the proximity of his final destination should be fed to his mobile device in an attractive manner. The key is to create incentives so that both consumers and merchants feel compelled to do it.

In the Free-Air model, a consumer is attracted to the platform via two strong incentives: (1) free bandwidth and (2) bargains and savings from nearby merchants.

Due to the recent changes in wireless data pricing, handset users' first and foremost concern is free bandwidth. Today, as the use of smartphones has exploded, while wireless data rates are reaching the theoretical limits, carriers are unable to meet bandwidth demand. Therefore, many carriers have switched to tiered pricing from all-you-can-eat fixed pricing. It is expected that all carriers will follow suit.

Today, a handset user might be enticed to go to a Starbucks store simply to get free Wi-Fi. In a similar and a more attractive manner, a Free-Air user does not even have to go to a special store to get free Wi-Fi. Free-air member merchants on the roadside or the hallway of a shopping mall will provide free Wi-Fi, in exchange for the right to send ads to a user's handset.

The second incentive for a handset owner also concerns monetary values. The primary concern for any consumer is price. As LBMA has a much higher click-through rate, merchants will be strongly motivated to offer special deals and attractive discounts. In Korea, some super sales are time sensitive. The timeliness of LBMA in this case is especially important for consumers: mobile ad receivers have an unfair advantage to these special deals over other consumers.

From a merchant's point of view, the foremost concern is getting a handset owner's consent to send ads. This consent is easily established by the strong incentive for a handset owner to get free Wi-Fi. To a merchant, a free Wi-Fi incurs practically zero operating costs as the free Wi-Fi will share the merchant's existing broadband connection. In one version of the business model, the Free-Air operator will give merchants free Wi-Fi access points (APs) as an incentive to join the Free-Air membership. The cost of the Wi-Fi APs will be recouped from the percentage cut from every sale that is consummated through the mobile ads.

Ad-Flows in Anticipation of Upcoming Merchants on the Road

In the Free-Air VANET, vehicles on a road are simply linked as a virtual circuit in parallel with the road. The Ad-Flow mechanism will forward ads to the in-vehicle handsets concerning the upcoming shops and service stations.

This kind of ads is crucial for travelers in a highway away from cities. Consider a Free-Air user sitting inside a vehicle traveling on a highway in a rural area. It is highly desirable to obtain detailed information regarding available shops and service stations in an area where he is not familiar with. If the handset user selects that he desires food-services information through the Free-Air application, then food-service merchants will forward special e-coupons and other promotions, along with driving directions. Since these ads are sent and displayed electronically, they can contain a richer set of information than a roadside billboard. Roadside billboards have numerous disadvantages: they can be missed, they are difficult to change, and they do not offer coupons.

Monetization Schemes

The main monetization schemes of Free-Air are two: (a) Fixed percentage cut from any transacted business resulting from the Ad-Flow (LBMA) mechanism (b) Monthly subscription fees for VMI service Other schemes are possible and are described below:

Equipment Sales

Free-Air will also sell handsets specialized for Free-Air applications. These handsets may or may not be tied to other carriers. If they are not tied to other carriers, these handsets will be the only handsets that can communicate through the free bandwidths offered by Free-Air. Therefore, these handsets will be highly suitable for travelers and low-income users. If they are not tied to other carriers, then the only antenna needed for the handsets will be Wi-Fi.

In addition, specialized handsets equipping with two Wi-Fi antennas can also be sold. These handsets will be suitable for getting higher bandwidths by bonding bandwidths from two nearby Wi-Fi APs. Such handsets will be very attractive for users that desire high-bandwidth applications. For example, people desiring HD video streaming will find these handsets very attractive.

License Fees to 3rd Party Vendors

Free-Air will also charge license fees for using proprietary technology embedded in Free-Air. For example, Skype and other VoIP providers may desire seamless mobility provided by Free-Air. Mobile IPTV providers may also desire seamless mobility inside a vehicle. HD video streaming applications may desire bandwidth bonding provided by Free-Air.

New Breed of MVNO: Virtual Infrastructure Provider with VANET

In the second phase of the Free-Air business model, more incentives will be added: (1) data mobility, (2) in-vehicle Ad-Flow, (3) VoIP with voice mobility, and (4) vehicle mobile Internet (VMI) service. Out of these four services, the first two, data mobility and in-vehicle Ad-Flow are free to Free-Air handset users.

VANET

While there are numerous proposals for VANET, but most of them are defective as they use the pure form of ad hoc networking: all communications share one common channel. This setup induces large amounts of radio interference and limits the available bandwidths. For this reason, most VANETs are designed for telematics applications only. For VMI applications which require large amounts of bandwidth, the space is dominated by 4G (WiMAX and LTE).

By applying proprietary VANET technology to a public transportation service like city buses and taxis, a brand new broadband infrastructure almost freely comparing other MVNO can be constructed. Moreover, because of P2P architecture, it is robust, scalable, cost-effective, and has even snowball effect; the more nodes are attached, the better it can serve. The VANET infrastructure step by step in a long term. Our first target is a public transportation. City buses are perfect target for building a VANET at the starting stage followed by equipping all the taxis and then selling aftermarket VANET box. At the final stage, the Free-Air VANET would be a de facto standard and car makers OEM our VANET box to be built in.

Social Networking for Free-Air

In the second phase, Free-Air application software will also have social networking service (SNS) functionality. Using this SNS functionality, a Free-Air member can recommend products or services to his friends and family. Viral marketing schemes can be implemented by building on the SNS functionality of Free-Air service.

P2P Social Networking without 3rd Party

The key difference between Free-Air SNS from traditional SNS from well-known providers such as Facebook and Twitter is that Free-Air enables SNS without a 3rd party. The rich media communications between social contacts are conducted directly without going through a 3rd party Web site.

The P2P setup comes with multiple advantages over the 3rd party Web service. First, a P2P location-based SNS does not require GPS information. Thus, even if a contact is sitting in front of his desktop computer without a GPS modem, he can still participate in a location-based SNS. Second, in a P2P SNS, there is no private information stored in a centralized data center somewhere in the cloud. People participating in P2P SNS will have a far better protection of private information. Third, it is very easy to set up and tear down a P2P social network. A private club can be easily set up and tear down without running a specialized application written specifically for Facebook, for example.

For these three reasons alone, P2P SNS will eventually become a significant competitor to a 3rd-party Web-based SNS.

Strong Technology Barriers

Still, technology barriers have prevented the ultimate form of LBMA from realization.

The major technological barrier for LBMA is the required database operations to match merchants with handsets according to a prescribed set of conditions. Each individual handset must be matched to a group of merchants based on the locations of handsets and merchants, the direction of movement of a handset, etc. Because these searches involve handsets and merchants only around a certain locality, it is highly unproductive to conduct these search-n-match operations using a centralized infrastructure. A distributed infrastructure is not only natural but also much more cost effective than a centralized counterpart.

Using the P2P technology, the Free-Air infrastructure is extremely simple and lean. There are no middleman entities between a merchant and a consumer. No dedicated servers are required: only lightweight software is inserted into merchants' existing Wi-Fi APs and servers. There will be no need for a dedicated data center infrastructure serving as the backend. Thus, operating costs of the Free-Air infrastructure are extremely low. A Free-Air operator will enjoy a margin that is unmatched by an operator that requires a centralized infrastructure.

Location-Based Service without Using GPS

In the initial deployment of Ad-Flow, there is no need to get handset's GPS coordinates. This is possible because Ad-Flow is implemented in a P2P manner. Each Free-Air APs are automatically linked to other local Free-Air APs within a distance range. The P2P links between Free-Air APs form a natural map of APs in relation to a handset attached to a Free-Air AP. Once a handset is attached to a particular Free-Air AP, all the nearby APs, which represent all the local merchants, will be notified and will forward ads to the handset. The Free-Air application on the handset will filter out unwanted ads according to preferences set by the handset users. The Free-Air (hence Ad-Flow) APs, also in a P2P manner, will conduct a matching process to forward ads according to a prescribed condition based on geotargeting. Mobile ads are relayed between Free-Air APs using a P2P process Using this technology, there is no need of a database storing the location information of merchants or handsets. This dramatically reduces the overhead in the search-n-match process in LBMA. Moreover, there is no need to constantly update the handset's moving locations. In contrast, for centralized LBMA service providers such as Google or Navteq, they have to constantly update the handset's location based on GPS information. These frequent updates consume bandwidth and in the new era of tiered pricing for bandwidth, the centralized solution is highly unattractive to users.

Other Benefits of P2P Technologies

Free-Air virtual infrastructure inherits all the benefits of P2P technologies. These include perfect scalability as the infrastructure is flat. The infrastructure also grows organically, without the need for demand forecasting. The infrastructure is also robust as any break down of equipment will only affect locally, and the infrastructure is self-healing. Moreover, as P2P communications are very difficult to track, all communications within the Free-Air infrastructure is very securable. All the data are stored; it will be a nightmare for any attacker or hacker to obtain sensitive information.

Free-Air Application Features

Non-Intrusive Advertising

Once a Free-Air handset is connected in a Free-Air zone, nearby Free-Air APs will push ads the newly attached handset. The Free-Air application will run as a background process consuming minimal resource of the handset when the handset is powered on.

Free-Air Ad Filtering

The Free-Air application will allow a user to filter available ads from nearby merchants. The filtering function will allow ads to be categorized in a structural way. A user can set on and off special features and sub-categories for the ads.

Spot and Time-Dependent Sales

As the Ad-flow feature is P2P and localized, a merchant can make a last minute decision to conduct a spontaneous spot or time-dependent sale. For example, a bakery may decide that near the closing time to sell the remaining bakery stock for a discount as these foods command a much lower price overnight. The available goods depend on the sales near the end of the day. Thus, this kind of last-minute localized spot sales can only be setup using a P2P Ad-Flow mechanism.

This kind of spot sales can be determined and advertised and be over in 30 minutes. The content of the ads may be simple but will be professionally displayed and relayed to Free-Air members within a short distance Advanced Free-Air Application Features Shopper Guide In this application, an electronic Shopper Guide will provide the following help to shoppers:

Price comparison for merchandize available within a local region

Consumer guide for durable goods

Products review

Guides to sophisticated equipment (home theater, high-tech gadgets, etc.)

Categorized guide to sales and special discount deals

Maps, directory assistance, and route assistance within a shopping district

Electronic coupons or rebates linked directly to merchants' POS (point of sale) terminals Recommendation from friends and family (social networking)

Reward point system for purchasing all kinds of goods and services

Personalized setting for all of the above

Some of the services may be fee-based. For example, many consumer guides and products review are not free even on the Internet. The reward point system may also be fee-based.

Spot (Instant) Sales Determination for Merchants

The unique advantage of Free-Air is that member purchasing profiles are locally available. This information is very valuable for local merchants. For example, in the Free-Air application, the handset owners are asked to enter their purchasing preferences. These preferences for all the handset owners within a local region can be used by merchants to determine if a spot sale will be profitable or not.

For example, based on long-term average of Free-Air member purchasing preferences observed in and around a shopping mall, a merchant discover that there are sufficient potential demand for a printer is high enough. Then the merchant can buy a stock of the printer through volume discount, and offer a promotional sale to the handset owners around the shopping mall. This information can also help a merchant to plan his floor space to stock the most demands goods. These preferences can be easily collected by the Free-Air virtual infrastructure and sell local merchants for a fee.

A Free-Air member may want to go to a nice coffee shop. However, the shopping complex is too large to search out on foot to find the best one. But the Shopper Guide service can come to help the member. Using a selected filtering function on the Free-Air application, a member can obtain all the available information on coffee shops in this mall at the gate. Once this feature has been used once, members will use them repeatedly to save them in shopping in a huge facility. The Shopper Guide service will become a necessary electronic guide in not just a huge shopping mall, but also any commercial premise where the member is not familiar with the location. For example, looking for rest rooms, getting to the car garage, and finding a particular store or department will be an easy job with the Shopper Guide.

In a department store, husband may stay at the lobby chair and wait for his wife to complete her shopping. If they all connected to a Free-Air APs, the wife can get all the useful information for shopping and husband can surf the Internet while waiting. Moreover, they two can chat with each other all the time during the shopping, using the fee Wi-Fi bandwidth from Free-Air zones.

When a member goes to an Electronics Market Complex, numerous shops sell the same or similar products at different prices. At such a place, a comprehensive local price comparison will be extremely helpful to a shopper! It is simply impossible to check out all the prices on foot; it will be too tiring. But, with the Shopper Guide service, a member can quickly compare all the prices, and zero in on the shops that he is most interested in making a purchase.

During a drive on a highway away from city, a member may need to find out a place to rest and get some food. Again, it will take time and driving to look around in a local town or service area. However, Ad-Flow will feed directly to the member in a structural way, the available food services facilities, with price and location information. For example, if a member is only interested in particular kind of food or particular chain restaurant, Ad-Flow will provide an invaluable guide electronically.

With Free-Air VANET, a member can access the Internet with a wireless broadband connection on a VANET quipped bus. A member can determine ahead of the final destination, a plan for shopping or other activities while on bus. This is possible, because Ad-Flow will forward local merchants' information and other relevant information to a member on Free-Air equipped bus.

Basic technology for the present invention is summarized below. Mobility technology of the present invention is named as P2P Mobility or PPM. The reason for such name is to emphasize that a main feature of PPM is enabling a pure form of mobility: peer-to-peer. In the classical sense, this is also called end-to-end mobility.

Another reason for the name is that PPM enables the workload of both control- and data-plane operations to be distributed to the end (peer) nodes in a very flexible way. The PPM technology is in essence a flexible overlay solution. Due to its flexibility, the PPM technology does not necessarily imply a pure-form of P2P control. PPM can also be implemented also in a hierarchical (centralized-distributed) architecture.

Technically, the PPM technology possesses the following capabilities:
1. Multi-path packet delivery in a single IP connection
2. Seamless mobility between all combinations of all IP bandwidths
3. NAT (network address translation) traversal By multi-path packet delivery it is meant that packets can travel on different paths in different or the same networks. Therefore, with PPM technology, an IP application can utilize multiple network bandwidths at the same time. Of course, a special case is that packets travel on different paths within the same IP network.

By seamless mobility it is meant that a session is uninterrupted as the devices move from one attachment point to another (changing IP address and port number). This includes the case when one or both end devices physically move, or they simply change the network attachment points without moving. Obviously, this definition covers all possible IP mobility cases: one-sided movement and two-sided movement, horizontal and vertical handover.

By NAT traversal it is meant that packets will reach the correct destination end points even as they traverse a NAT or firewall (or more generally, a middle box) in their paths. It should be noted PPM is especially suited for the most difficult case of dynamic NAT traversal: packets traversing NAT or middle boxes even as one or both end devices change their IP attachment points.

Figure 16:
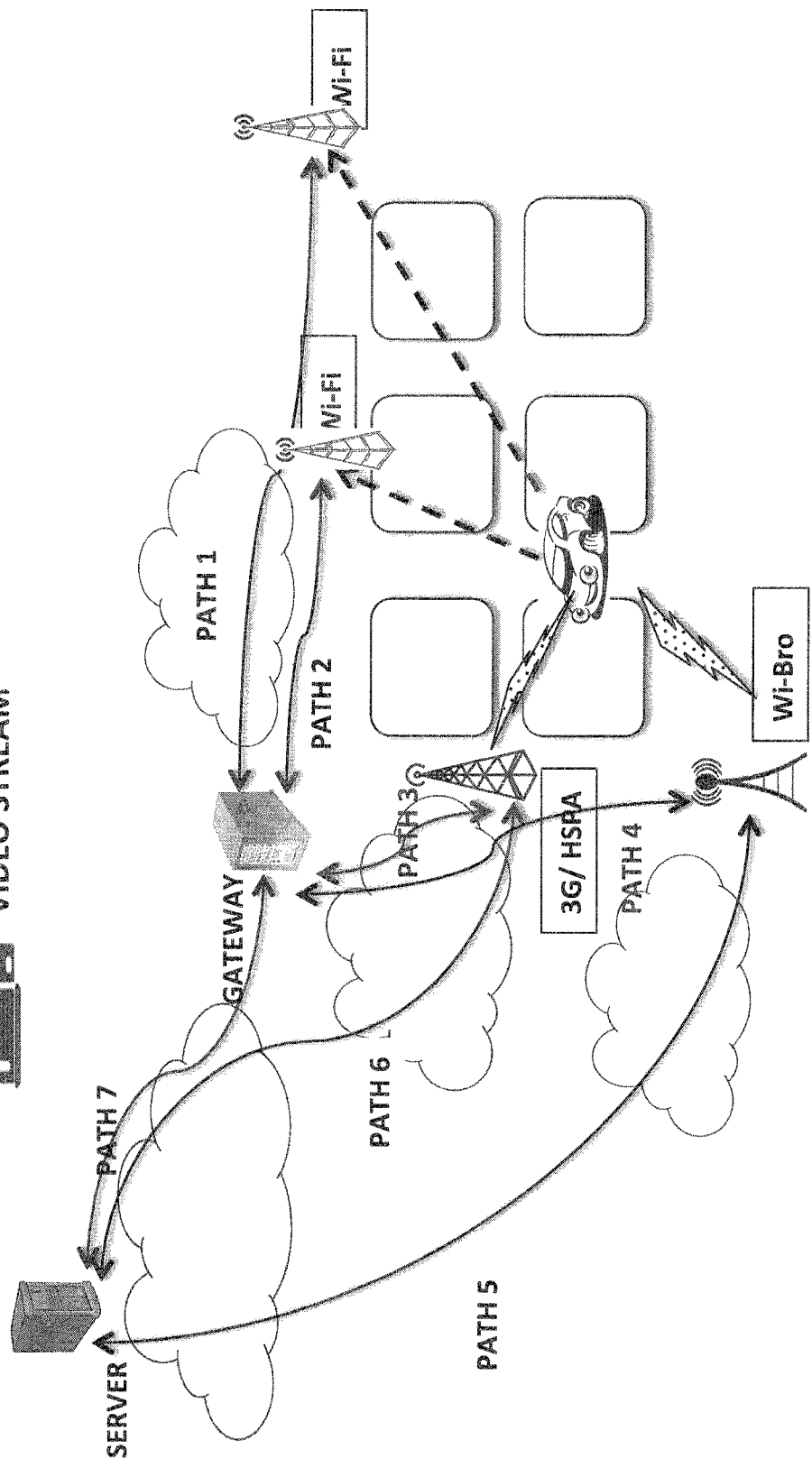
FIG. 16 shows examples of bandwidth bonding.

The PPM technology was developed by attacking the fundamental problem of IP rigidity. IP rigidity is a problem with three sub-problems. The first sub-problem is that IP cannot distinguish between location identity and host identity. In IP, a single IP address is used to identify both a host and its point of attachment. This design assumes a host never moves. However, once a host is to change its attachment point, connections to the host will break. Today, IP addresses do change all the time due to either mobility or NAT traversal. The second IP rigidity sub-problem is that IP does not explicitly specify a path. In IP, paths are implicitly identified and packets in the same connection travel in a single path. This forces all packets in the same application to use only one network and only one path. In contrast, under multi-path packet delivery, a host can use multiple wireless bandwidths simultaneously. Example of bandwidth bonding is shown in FIG. 16.

The third IP rigidity sub-problem is NAT traversal which can be understood as packets not reaching the destinations due to changes in the IP addresses and port numbers in traversing a NAT or middle box.

Figure 13:
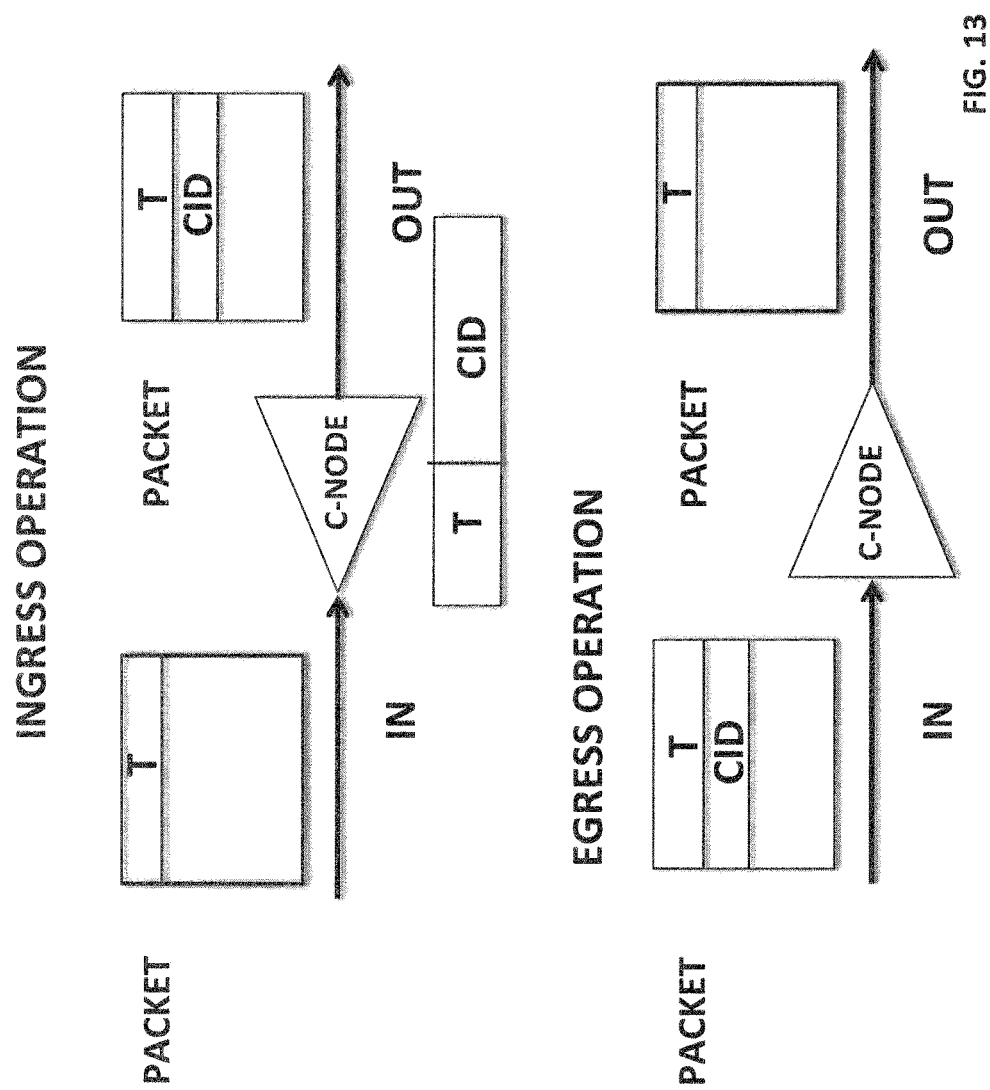
FIG. 13 shows ingress and egress operation on C-nodes.
Figure 14:
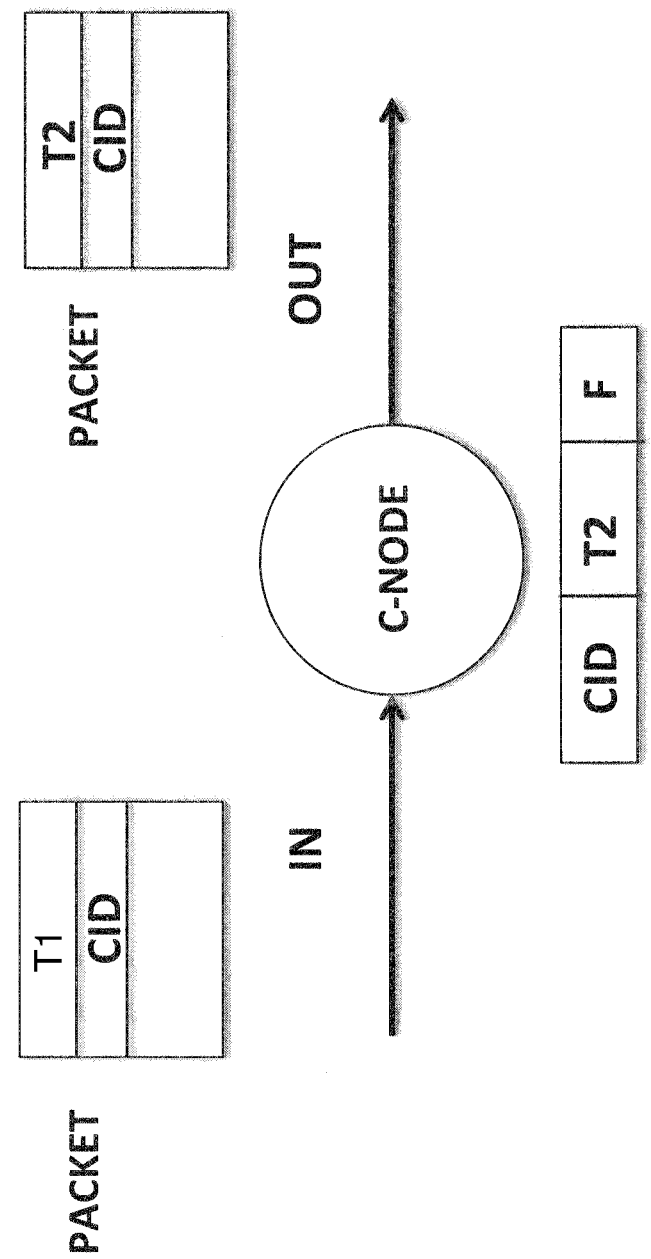
FIG. 14 shows forwarding operation on C-nodes.
Figure 15:
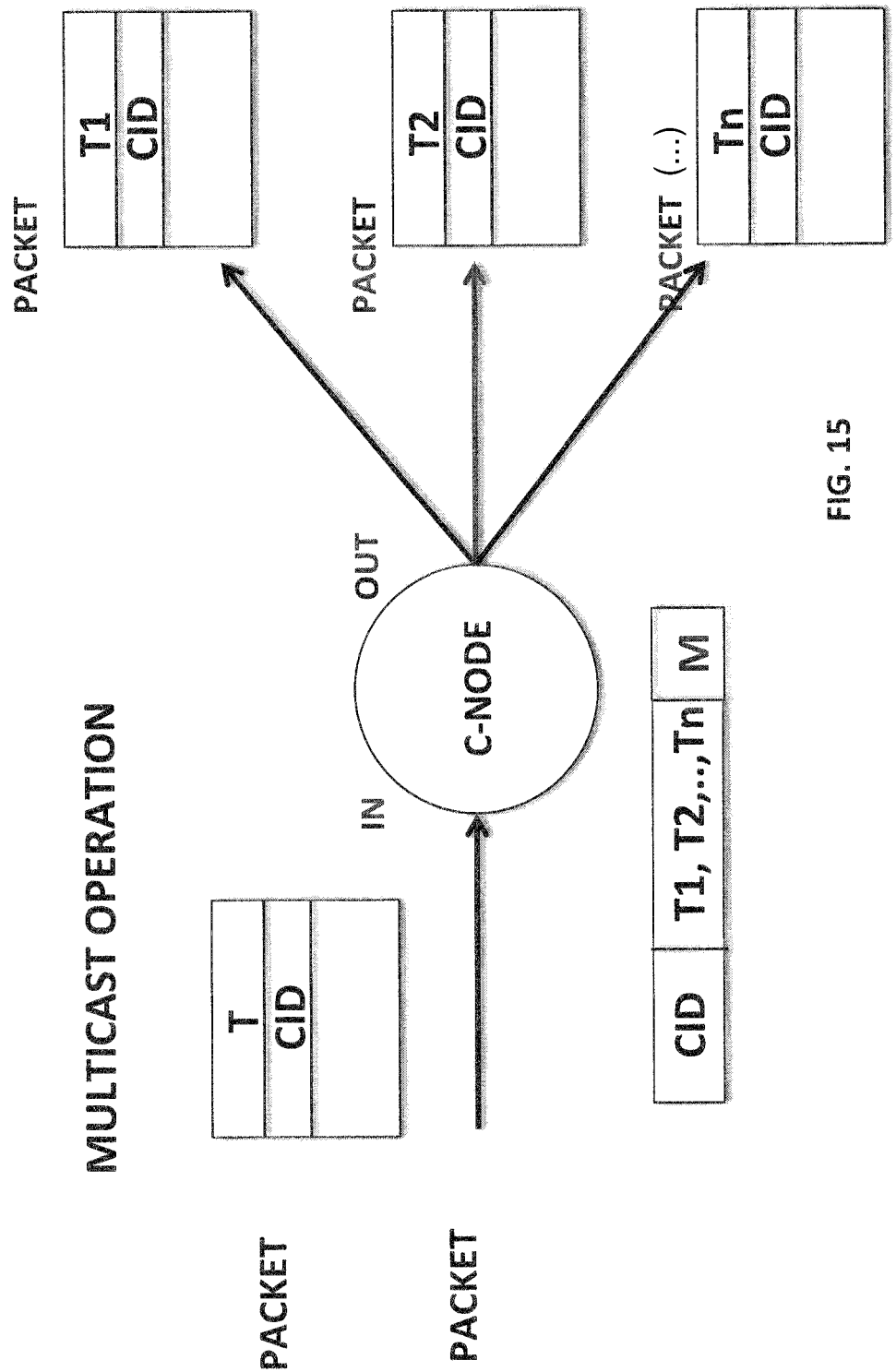
FIG. 15 shows multicast operation on C-nodes.

The IP rigidity problem is a routing problem. The simplest and direct way to attack this problem is to enable IP to differentiate a flow. In PPM, flow differentiation is accompanied through atomic operations: adding and removing a flow identity, forwarding packets in a flow, duplicating packets from a single flow to multiple flows, and splitting packets from a flow to multiple flows. This is illustrated in FIGS. 13-15.

The symbol T represents a tetrad, which is defined to be the pair <source AP, destination AP>, where an AP (address-port number) is defined to be the pair <IP address, port number>. In IP, a tetrad uniquely identifies a session and its path (through the source and destination IP addresses). In PPM, a MTEG (mobility tetrad enhancing group) layer is inserted to identify a flow, which is called a CID (connection ID). At each C-node, which is a software module that does the signal processing, a table of CIDs and tetrads are kept. A mapping is also facilitated to map a CID into a tetrad, and a tetrad into a CID. The entire set of operation is called C-forwarding (connection-forwarding).

In PPM, the C-forwarding concept is only the core concept, which is further developed into specific algorithms and protocols to accomplish NAT traversal, mobility, and multi-path packet delivery. Since PPM is a layer-3 technology, these works have to be done in the kernel space. In the user space, handover and mobility management has to be accomplished. These management functions are similar to those implemented by the well-known MIH (media independent handover) protocol suite. It should be noted that PPM also includes user-space mobility management technologies.

In mobility management, PPM also includes a fast handover technology. Fast handover is a technique that utilizes an access point (AP) or gateway to facilitate fast association of usable IP addresses to mobile devices that need to access an IP the network through the access point or gateway.

The disclosures of US Patent Application Publication Nos. US2008/0253373 (System and Method for Supporting Flexible Overlays and Mobility in Ip Communication and Computer Networks), US2009/0119393 (System and architecture for supporting mobility and multipath packet delivery in ip network stacks), US2008/0107124 (System and method for supporting mobility and multipath packet delivery in IP communications and computer networks across nat and firewall boxes), US2008/0107080 (System and method of fast channel scanning and ip address acquisition for fast handoff in ip networks), US 2011/0299554 (Solutions for dynamic NAT and firewall traversal) are Incorporated by reference to this Application.

The invention claimed is:

1. An electronic data communication network comprising:
a plurality of moving nodes; and
a plurality of stationary nodes;
wherein the moving node comprises a vehicle communication device installed in a vehicle; wherein the vehicle moves along predetermined paths; wherein the moving node comprises a starting node that sends the data, a relay node that relays the data, and an ending node that receives data;
wherein a virtual circuit is formed along a path comprising the relay nodes for data communication; wherein the virtual circuit is identified by the path; wherein routing of data from the starting node to the ending node is performed with P2P routing algorithm; wherein the stationary node comprises a fixed communication device installed in a fixed communication structure; wherein the predetermined paths comprises a plurality of roads for vehicles, wherein the stationary nodes comprise a plurality of road side units installed along the roads, wherein the road comprises a plurality of zones, wherein the virtual circuit is tied to the zones, wherein the virtual circuit operates at layer 2 as a service to layer 3, wherein data frame is identified a virtual circuit ID at layer 2, wherein the node looks up the virtual circuit ID, retrieves the identifier of the next channel to transmit the frame from a virtual circuit routing table using the virtual circuit ID, whereby a processing delay is comprised of the virtual circuit ID lookup time and the time to retrieve the next channel identifier.

2. The electronic data communication network of claim 1, wherein the stationary node further comprises a plurality of commercial units, wherein merchant of the commercial unit is notified with information for moving nodes approaching to the commercial unit, wherein the merchant provides time and location dependent advertisements to users of the moving nodes, wherein the advertisements are filtered by the users of the moving nodes.

3. The electronic data communication network of claim 2, wherein the positions of moving nodes relative to the stationary nodes form a map for the moving nodes, wherein the merchants are provided user's preference together with the position of the user within the map.

4. The electronic data communication network of claim 1, wherein the relay node is chosen utilizing broadcast so that the distance between a transmitting node and a receiving node is increased up to a threshold value that provides minimum effective bandwidth, whereby the number of hops between two end points is minimized.

5. The electronic data communication network of claim 1, wherein a routing table comprises records, wherein the record comprises VCID, node_status field, and next_channel ID, wherein the node keeps track of the location by the subzone ID and the number of virtual circuits for which the node carries traffic.

6. The electronic data communication network of claim 5, wherein the P2P routing algorithm performs updating the current subzone position for each node, detection of a node in a virtual circuit has left the network, selection of a new node in the virtual circuit that has change in its nodes, determination of the channel number for each node in each virtual circuit, updating the routing table according to the changes in the nodes, and setting up and tearing down virtual circuit, whereby moving of the vehicles relative to the roads is reflected.

7. The electronic data communication network of claim 6, wherein the GPS coordinate of a subzone is mapped to the IP address of a node in the subzone, whereby the IP address of the node approximately reflects the GPS coordinates of the node, wherein each node maintains a table of active IP addresses in the subzone in which it is located, wherein the table is updated using a distributed hash table algorithm, whereby IP address conflicts are avoided.

8. The electronic data communication network of claim 1, wherein the predetermined path for the vehicles comprise a relative topology in which all moving nodes moving on the same road have approximately zero relative velocity, wherein the subset of all moving nodes on the same road form a relative topology that does not change in time, wherein packets from and to the nodes inside a subset of the relative topology are restricted to restricted to be routed through the nodes in the subset of moving nodes and bordering nodes, whereby the routing in the network is decomposed into routings associated with individual relative topologies.

9. The electronic data communication network of claim 8, wherein routing is performed so that the packet flows from the Internet to moving nodes are in the anti-parallel direction of the traffic flow, and the packet flows from the moving nodes to the Internet are in the parallel direction of the traffic flow, whereby need for forced handovers is reduced.

10. The electronic data communication network of claim 1, wherein all moving nodes on the same road are organized into disjoint subsets, wherein each disjoint subset is assigned a discrete color, wherein packets are forwarded from one colored subset to the next colored subset.

11. The electronic data communication network of claim 1, wherein data frames are reserved in blocks, wherein each block is assigned a block ID, wherein a number of relay moving nodes are specified as backup relay node, wherein if timeout occurs, then backup relay node making the detection retransmits the block, wherein the block ID is unique in all the transmissions from a source moving node to a destination stationary node.

12. The electronic data communication network of claim 1, wherein a control plane maintains topology tables and IP address tables to enable moving nodes and stationary nodes to find each other in terms of IP addresses; assigns channels; and calculates potential trajectory of each moving node to start an anticipative handover.

13. The electronic data communication network of claim 1, wherein packets are transmitted within the same TCP connection using multiple bandwidths whereby bandwidth bonding increases throughput.

14. The electronic data communication network of claim 1, wherein the user of the vehicle communication device is provided with a stationary communication device that is adapted to be used at a fixed location, is included as part of the network, and is authenticated for the same user.

15. The electronic data communication network of claim 1, wherein the routing algorithm updates the current subzone position for each node, detects a node in the virtual circuit, which has left the electronic data communication network, selects a new node in the virtual circuit that has change in its nodes, determines the channel number for each node in each virtual circuit, updates the routing table according to the changes in the virtual circuit nodes, and sets up or tears down the virtual circuit.

* * * * *